US009955119B2

(12) United States Patent
Leske et al.

(10) Patent No.: US 9,955,119 B2
(45) Date of Patent: *Apr. 24, 2018

(54) MULTIMEDIA CONFERENCE BROADCAST SYSTEM

(71) Applicant: Google Inc., Mountain View, CA (US)

(72) Inventors: Matthew J. Leske, Stockholm (SE); Loren Groves, Sunnyvale, CA (US); Tristan Schmelcher, Seattle, WA (US); Timothy S. Milligan, Redmond, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,678

(22) Filed: Aug. 8, 2016

(65) Prior Publication Data

US 2016/0353061 A1 Dec. 1, 2016

Related U.S. Application Data

(63) Continuation of application No. 14/678,908, filed on Apr. 3, 2015, now Pat. No. 9,414,018, which is a continuation of application No. 13/623,755, filed on Sep. 20, 2012, now Pat. No. 9,001,178, which is a continuation-in-part of application No. 13/360,637, filed on Jan. 27, 2012, now Pat. No. 8,908,005.

(51) Int. Cl.
*H04N 7/14* (2006.01)
*H04N 7/15* (2006.01)
*H04N 5/265* (2006.01)

(52) U.S. Cl.
CPC ............ *H04N 7/152* (2013.01); *H04N 5/265* (2013.01); *H04N 7/147* (2013.01); *H04N 7/155* (2013.01)

(58) Field of Classification Search
CPC ...................................... H04N 7/14
USPC .......... 348/14.01, 14.03, 14.07, 14.08, 14.12
See application file for complete search history.

(56) References Cited

U.S. PATENT DOCUMENTS

| | | | |
|---|---|---|---|
| 6,167,033 A | 12/2000 | Chang et al. | |
| 6,300,973 B1 * | 10/2001 | Feder | H04N 7/152 348/14.09 |
| 6,473,858 B1 * | 10/2002 | Shimomura | H04N 7/152 348/E7.056 |
| 6,477,707 B1 | 11/2002 | King et al. | |
| 6,697,365 B1 | 2/2004 | Messenger | |
| 6,978,306 B2 | 12/2005 | Miller et al. | |

(Continued)

*Primary Examiner* — Olisa Anwah
(74) *Attorney, Agent, or Firm* — McDermott Will & Emery LLP

(57) ABSTRACT

A multimedia conference broadcast system may include one or more processors and a memory. The one or more processors may receive video streams and audio streams from participant devices. The one or more processors may transmit, to each of the participant devices, the video streams and the audio streams corresponding to the other devices. The one or more processors may receive a request to broadcast the video streams and the audio streams from one of the participant devices. The one or more processors may generate a composite multimedia stream based on the video streams and the audio streams received from the participant devices. The one or more processors may broadcast the composite multimedia stream to viewer devices that are separate from the participant devices.

17 Claims, 9 Drawing Sheets

(56) References Cited

U.S. PATENT DOCUMENTS

| | | |
|---|---|---|
| 7,280,492 B2 | 10/2007 | Magnuski |
| 7,593,032 B2 * | 9/2009 | Civanlar ............... H04N 7/152 |
| | | 348/14.09 |
| 7,643,560 B2 | 1/2010 | Hong et al. |
| 7,692,682 B2 | 4/2010 | Pun et al. |
| 7,701,851 B2 | 4/2010 | Chakareski et al. |
| 7,933,294 B2 | 4/2011 | Chakareski et al. |
| 8,681,954 B1 | 3/2014 | Shires et al. |
| 8,693,648 B1 | 4/2014 | Drugge et al. |
| 8,908,005 B1 | 12/2014 | Leske et al. |
| 9,001,178 B1 | 4/2015 | Leske et al. |
| 2002/0191071 A1 | 12/2002 | Rui et al. |
| 2003/0055719 A1 | 3/2003 | Faigle |
| 2003/0169330 A1 * | 9/2003 | Ben-Shachar ......... H04N 7/152 |
| | | 348/14.09 |
| 2005/0097169 A1 | 5/2005 | Mukherjee et al. |
| 2006/0023062 A1 * | 2/2006 | Elbaze .................... H04N 7/15 |
| | | 348/14.09 |
| 2007/0200923 A1 | 8/2007 | Eleftheriadis et al. |
| 2007/0206673 A1 | 9/2007 | Cipolli et al. |
| 2007/0230566 A1 | 10/2007 | Eleftheriadis et al. |
| 2007/0230568 A1 | 10/2007 | Eleftheriadis et al. |
| 2007/0263087 A1 | 11/2007 | Hong et al. |
| 2007/0291837 A1 | 12/2007 | Eleftheriadis |
| 2008/0114891 A1 * | 5/2008 | Pereira ................ H04L 12/1854 |
| | | 709/231 |
| 2008/0159180 A1 | 7/2008 | Civanlar et al. |
| 2008/0159384 A1 | 7/2008 | Civanlar et al. |
| 2008/0159404 A1 | 7/2008 | Hong et al. |
| 2008/0165864 A1 | 7/2008 | Eleftheriadis et al. |
| 2008/0211901 A1 | 9/2008 | Civanlar et al. |
| 2008/0239062 A1 | 10/2008 | Civanlar et al. |
| 2009/0116562 A1 | 5/2009 | Eleftheriadis |
| 2009/0326979 A1 | 12/2009 | Ryan |
| 2010/0002069 A1 | 1/2010 | Eleftheriadis et al. |
| 2011/0182354 A1 | 7/2011 | Jang et al. |
| 2011/0222545 A1 | 9/2011 | Eleftheriadis |
| 2011/0292161 A1 | 12/2011 | Sharon et al. |
| 2012/0072499 A1 | 3/2012 | Cipolli et al. |
| 2012/0082214 A1 | 4/2012 | Horowitz et al. |
| 2012/0082237 A1 | 4/2012 | Jang et al. |
| 2012/0212668 A1 | 8/2012 | Schultz et al. |
| 2013/0027508 A1 | 1/2013 | Charish et al. |
| 2013/0205408 A1 | 8/2013 | Yerli |
| 2014/0267574 A1 | 9/2014 | Schneider |
| 2015/0215582 A1 | 7/2015 | Leske et al. |

* cited by examiner

MULTIMEDIA CONFERENCE BROADCAST SYSTEM

REFERENCE TO RELATED APPLICATIONS

The present application for patent is a continuation of U.S. application Ser. No. 14/678,908, filed Apr. 3, 2015, entitled "Multimedia Conference Broadcast System," issued as U.S. Pat. No. 9,414,018, which is a continuation of U.S. application Ser. No. 13/623,755, filed Sep. 20, 2012, entitled "Multimedia Conference Broadcast System," issued as U.S. Pat. No. 9,001,178, which is a continuation-in-part of U.S. application Ser. No. 13/360,637, filed Jan. 27, 2012, entitled "Multiway Video Broadcast System," now U.S. Pat. No. 8,908,005, which are assigned to the assignee hereof and hereby expressly incorporated by reference herein.

TECHNICAL FIELD

The present description relates generally to broadcast systems, and more particularly, but not exclusively, to multimedia conference broadcast systems.

BACKGROUND

Multiple individual users engaging in a multimedia conference may be able to view and hear one another irrespective of the users' physical locations. In this manner, multimedia conferences may allow disparately located users to participate in activities generally associated with collocated users, such as panel discussions, multi-person interviews, or classes. In some instances, a multimedia conference may be of interest to third party viewers who are not participants in the multimedia conference. For example, third party viewers may be interested in viewing, in real-time, a discussion panel held via a multimedia conference.

SUMMARY

The disclosed subject matter relates to a computer implemented method for broadcasting a multimedia conference. The method may include providing, using one or more computing devices, a hosted multimedia conference to a plurality of participant devices, receiving, using the one or more computing devices, a request to broadcast the multimedia conference from one of the plurality of participant devices, generating, using the one or more computing devices, a composite multimedia stream based on a plurality of video streams and a plurality of audio streams received from the plurality of participant devices, and broadcasting the composite multimedia stream to a plurality of viewer devices that are separate from the plurality of participant devices.

In another aspect, the computer implemented method may include receiving, using one or more computing devices, a request to broadcast a multimedia conference of a plurality of participant devices, establishing, using the one or more computing devices, a connection to the multimedia conference as a non-participant device, receiving, using the one or more computing devices, a plurality of video streams and a plurality of audio streams from the plurality of participant devices through the connection established to the multimedia conference as the non-participant device, generating, using the one or more computing devices, a composite multimedia stream based on the plurality of video streams and the plurality of audio streams received from the plurality of participant devices, and broadcasting, using the one or more computing devices, the composite multimedia stream to a plurality of viewer devices that are separate from the plurality of participant devices.

The disclosed subject matter also relates to a computer-implemented method for requesting broadcast of a multimedia conference. The method includes participating, using one or more computing devices, in a multimedia conference with a plurality of participant devices, requesting, using the one or more computing devices, a broadcast of the multimedia conference, and receiving, using the one or more computing devices, an indication that the multimedia conference is being broadcast to a plurality of viewer devices that are separate from the plurality of participant devices.

The disclosed subject matter also relates to a multimedia conference broadcast system. The system may include one or more processors and a memory including instructions that, when executed by the one or more processors, cause the one or more processors to: receive a plurality of video streams and a plurality of audio streams from a plurality of participant devices, transmit, to each of the plurality of participant devices, the plurality of video streams and the plurality of audio streams corresponding to the other of the plurality of devices, receive a request to broadcast the plurality of video streams and the plurality of audio streams from one of the plurality of participant devices, generate a composite multimedia stream based on the plurality of video streams and the plurality of audio streams received from the plurality of participant devices, and broadcast the composite multimedia stream to a plurality of viewer devices that are separate from the plurality of participant devices.

The disclosed subject matter also relates to a machine-readable medium embodying instructions that, when executed by a machine, allow the machine to perform a method for broadcasting a multimedia conference. The method may include receiving a request to broadcast a multimedia conference of a plurality of participant devices, establishing a connection to the multimedia conference as a non-participant device, receiving a plurality of video streams and a plurality of audio streams from the plurality of participant devices through the connection established to the multimedia conference as the non-participant device, generating a composite multimedia stream based on the plurality of video streams and the plurality of audio streams received from the plurality of participant devices, and broadcasting the composite multimedia stream to a plurality of viewer devices that are separate from the plurality of participant devices.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
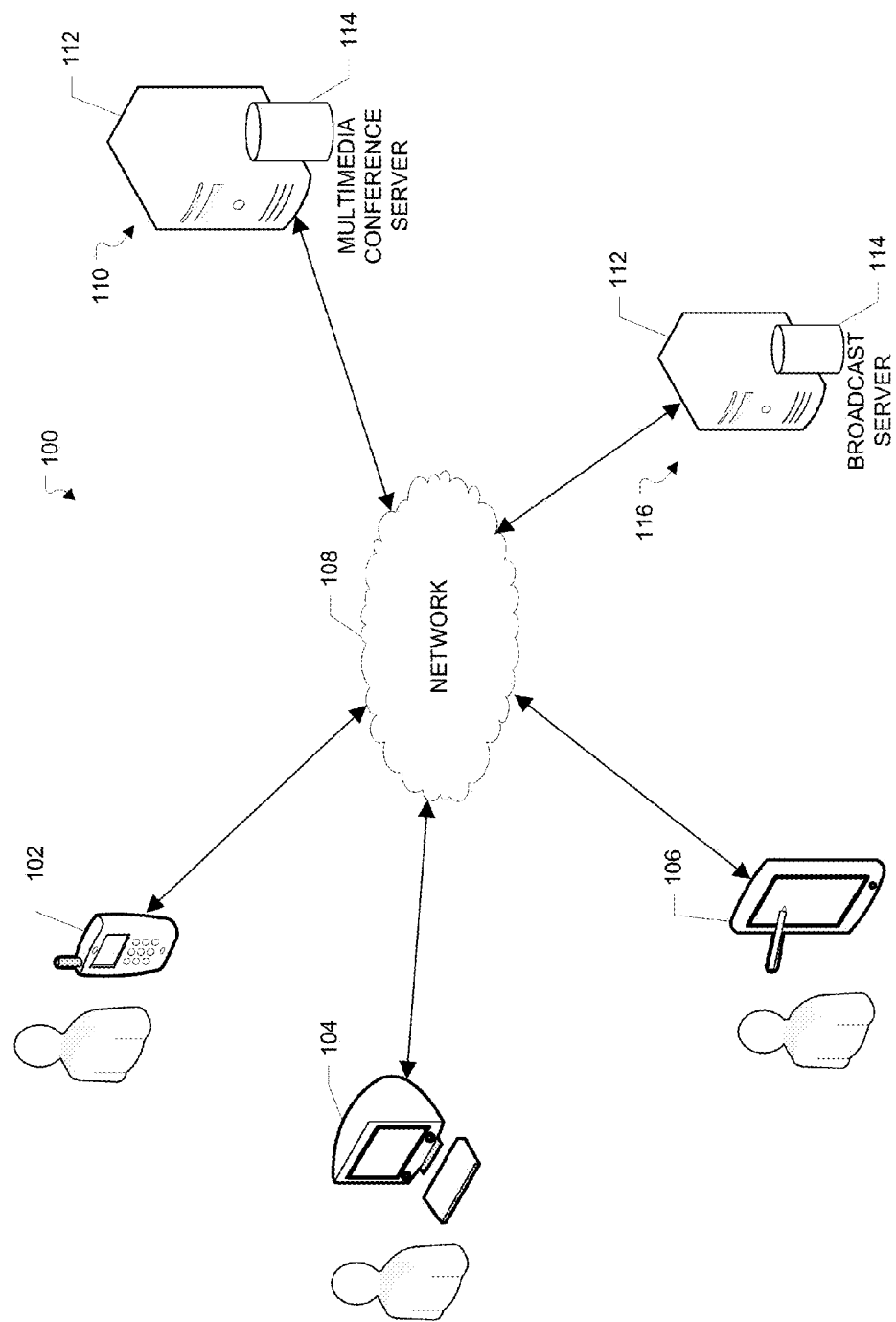
FIG. 1 illustrates an example network environment that may provide for a multimedia conference broadcast system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

Hosted multimedia conferencing technology enables individual users located in disparate geographic locations, and operating disparate devices, e.g. devices having different operating systems, different screen resolutions, different processing capabilities, etc., to engage in a multimedia conference without the need for each user to possess expensive video conferencing equipment. In one example, a user may engage in a hosted multimedia conference using any web browser-enabled device. In this manner, hosted multimedia conferencing may allow users to view and hear one another, such as in order to participate in panel discussions, multi-person interviews, or classes, irrespective of the users' geographic locations and with minimal user device requirements.

In some instances it may be desirable to broadcast a multimedia conference to third party viewers who are not participants in the multimedia conference. For example, third party viewers may be interested in viewing, in real-time, a discussion panel held via a multimedia conference. However, significant processing resources may be necessary to combine the audio and/or video streams of the participants in the multimedia conference to generate a composite multimedia stream for broadcast. Since the hosted multimedia conference allows users to participate with minimal device requirements, the devices of the participants may not be capable of generating a composite multimedia stream for broadcast. Furthermore, significant content distribution resources may be necessary to broadcast the composite multimedia stream, and such content distribution resources may not be available to the participants in the multimedia conference.

Although existing television networks may combine separate video feeds into a single television broadcast, the feeds typically are manually combined by production staff to form the television broadcast. Manually combining individual feeds may become tedious and inefficient when combining a large number of feeds, and therefore existing television systems may not be suitable for combining video streams from several participants of a multimedia conference into a composite multimedia stream. In addition, although existing television systems may allow production staff to control the layout of multiple video feeds in the television broadcast, existing television systems may be unable to extend the control of the layout, and the processing resources associated therewith, to the systems transmitting the individual feeds. Furthermore, broadcasting through a television system may not be scalable to a large number of users. For example, a television network may typically license a broadcast medium, such as a radio spectrum and/or a satellite footprint, and may use the licensed medium for broadcast. However, the broadcast medium, such as the radio spectrum and/or the satellite footprint, may be a scarce resource.

In a multimedia conference broadcast system, a server hosting a multimedia conference may allow one or more of the participants in the multimedia conference to initiate a broadcast of the multimedia conference to third party viewers, irrespective of the processing capabilities or bandwidth availability associated with the participants' devices. Upon receiving a request to initiate a broadcast of the multimedia conference, the server may cause a device to join the multimedia conference in a non-participating capacity. The device that joins the multimedia conference may be referred to as a non-participant device. In one example, the non-participant device may receive audio and/or video streams from the devices of each of the participants in the multimedia conference, but the non-participant device may not provide any audio or video streams to the devices of the participants in the multimedia conference. In one instance, the non-participant device may be a broadcast server with significant processing resources, such as a data center, a device of one of the participants, the server hosting the multimedia conference, and/or any other computing device.

The non-participant device, such as a broadcast server, may combine the audio and/or video streams received from each of the participants to generate a composite multimedia stream for broadcasting the multimedia conference. In one example, the broadcast server may decode the audio and/or video streams received from each of the participants into a raw format, may compose the composite multimedia stream from the raw format streams, and may encode the composite multimedia stream into a format suitable for broadcast. Alternatively, or in addition, the broadcast server may generate the composite multimedia stream without decoding the audio and/or video streams received from each of the participants.

The broadcast server may also determine a layout of the composite multimedia stream. For example, the layout may define a number of pixels of the composite multimedia stream allocated to each of the video streams of the participants, a position of the video streams of the participants in the composite multimedia stream, a volume level of the audio streams of the participants in the composite multimedia stream, or generally any other characteristic of the audio and/or video streams in the composite multimedia stream. The broadcast server may then broadcast the composite multimedia stream, such as over the Internet through an existing content distribution network, by publishing a network resource locator for accessing the broadcast, such as a uniform resource locator (URL), or through any other means of broadcasting a multimedia stream. Thus, the multimedia conference broadcast system may not suffer from the distribution limitations of a television system, since the composite multimedia stream can be broadcast over the Internet where multiple composite multimedia streams can be broadcast simultaneously.

The broadcast server may adaptively modify the layout of the composite multimedia stream based on one or more characteristics of the audio and/or video streams received from each of the participants. For example, the broadcast server may increase the number of pixels of the composite multimedia stream allocated to a video stream that corresponds to a participant who has started to communicate, and/or the broadcast server may decrease the number of pixels of the composite multimedia stream allocated to a video stream that corresponds to a participant who has stopped communicating. Similarly, the broadcast server may increase the volume of an audio stream that corresponds to a participant who has started to communicate, and/or the broadcast server may decrease the volume of an audio stream that corresponds to a participant who has stopped communicating. The broadcast server may process the audio streams and/or video streams of the participants in order to identify when a participant has started to communicate and/or to identify when a participant has stopped communicating.

Alternatively, or in addition, the server and/or the broadcast server may provide a user interface to one or more of the participants in the multimedia conference, such as the participant who initiated the broadcast of the multimedia conference. The user interface may allow the participant to control characteristics of the composite multimedia stream that is being broadcast, such as the layout of the composite multimedia stream, irrespective of the processing capabilities and/or bandwidth availability associated with the device of the participant. A participant that has been provided with the user interface for controlling characteristics of the composite multimedia stream may be referred to as a controlling participant. For example, the user interface may allow a controlling participant to control the number of pixels allocated to each of the video streams in the composite multimedia stream, to control the position of each of the video streams in the composite multimedia stream, to control the volume level of the audio streams in the composite multimedia stream, to control the quality of each of the audio streams and/or video streams, or generally to control any characteristic of the audio and/or video streams in the composite multimedia stream that is being broadcast.

In operation, the device of the controlling participant may transmit control commands to the broadcast server, such as layout control commands, such that the processing resources of the broadcast server are utilized for modifying the layout of the composite multimedia stream, rather than the processing resources of the device of the controlling participant. Alternatively, or in addition, the composite multimedia stream may be modified using processing resources of the device of the controlling participant, such as when the device of the controlling participant is hosting the non-participating entity.

The server may also provide the controlling participant, and/or the participant who initiated the broadcast of the multimedia conference, with a user interface for reviewing and/or controlling the number of devices presently viewing the broadcast of the multimedia conference. For example, the user interface may display the number of devices presently viewing the broadcast, and/or the user interface may allow the controlling participant to set a maximum number of viewers for the broadcast. In this example, once the maximum number of viewers of the broadcast is reached, additional users will not be able to view the broadcast until one of the existing viewers stops viewing the broadcast.

Alternatively, or in addition, the server may implement one or more access controls in order to allow the controlling participant, and/or the participant who initiated the broadcast, to control the devices that are able to view the broadcast. For example, the server may provide the controlling participant, and/or the participant who initiated the broadcast, with a user interface for specifying users that should be allowed to view the broadcast, such as a white list, and/or to specify users who should not be allowed to view the broadcast, such as a black list. The user interface may provide the controlling participant with a view of their social network, such that the controlling participant may add one or more users, or one or more groups or circles of users, from their social network to a white list or to a black list.

In one example, the broadcast server may encode different versions of the composite multimedia stream based on the bandwidth/system capabilities of the devices of the viewers of the composite multimedia stream. The broadcast server may utilize a classification system to classify the devices of the viewers based on the bandwidth available to the devices and/or one or more attributes of the devices, such as the processing resources of the devices, the screen sizes of the devices, or generally any attributes of the devices that may impact receiving a broadcast of a multimedia conference. Upon classifying the devices of the viewers, the broadcast server may use different encoding parameters to encode a different version of the composite multimedia stream for each of the classifications of viewers, such as through the use of a scalable video codec. For example, the composite multimedia stream may be encoded with a low resolution and/or a low frame rate for devices classified as having a small amount of available bandwidth, while the composite multimedia stream may be encoded with a high resolution and/or a high frame rate for devices classified as having a large amount of available bandwidth.

Alternatively, or in addition, the broadcast server may encode different versions of the composite multimedia stream having different layouts based on the display capabilities of the devices of the viewers. For example, a version of the composite multimedia stream having a layout that only includes a video stream corresponding to one of the participants in the multimedia conference, such as a communicating participant, may be encoded for devices with smaller displays, such as phones or smartphones. Alternatively, or in addition, a version of the composite multimedia stream having a layout that includes video streams corresponding to each of the participants in the multimedia conference may be encoded for devices with larger displays, such as desktop computers.

Alternatively, or in addition, the broadcast server may encode multiple versions of the composite multimedia stream that each has a different layout, and the broadcast server may provide a control to the devices of viewers such that the viewers can select which version of the composite multimedia stream they would like to receive and view. For example, the broadcast server may encode a different version of the composite multimedia stream for each participant in the multimedia conference where each version includes a different participant displayed as the primary video stream, e.g. the largest video stream, and the remaining participants displayed as secondary video streams, e.g. smaller video streams. In this example, a viewer may be able to select any of the participants in the multimedia conference, and upon receiving a selection of one of the participants from the device of the viewer, the broadcast server may provide the device of the viewer with the version of the composite multimedia stream that includes the selected participant displayed as the primary video stream.

It may also be desirable to conserve the bandwidth used by the multimedia conference, such as bandwidth used to communicate between the participant devices and the server hosting the multimedia conference. For example, it may be desirable for the device of a communicating participant to transmit a high quality video stream; however, high quality video may not be as imperative for non-communicating participants. As such, the bandwidth consumed by the multimedia conference may be reduced by causing the devices of the non-communicating participants to transmit a low quality video stream, while still allowing the device of the communicating participant to transmit a high quality video stream. The quality of a video stream may be increased, such as from a low quality video stream to a high quality video stream, or decreased, such as from a high quality video stream to a low quality video stream, by changing the resolution of the video stream, changing the frame rate of the video stream, changing the image quality of the video stream, or generally by changing any parameters that may impact the quality of the video stream.

In one example, a server hosting a multimedia conference may determine the communicating participant, and may send a control message to the device of the communicating participant indicating that the device should transmit a high quality video stream. If the communicating participant changes, the server may send a control message to the device of the previously communicating participant indicating that the device should transmit a low quality video stream, and the server may send a control message to the device of the presently communicating participant indicating that the device should transmit a high quality video stream. Since the server needs to determine a change in the communicating participant and then send a control message to the device of the presently communicating participant indicating that the device should transmit a high quality video stream, there may be a delay between the time when the communicating participant changes, such as the time when a different participant begins speaking, and the time when the device of the presently communicating participant transmits a high quality video stream.

The delay in switching to a high quality video stream may not be noticeable to the participants in the multimedia conference, as the participants may be accustomed to variations in audio and/or video stream quality during multimedia conferences, and therefore may not expect to continuously receive high quality video. However, if the multimedia conference is being broadcast to third party viewers, the third party viewers may expect to continuously receive high quality video. For example, a multimedia video conference may be broadcast to the third party viewers through a composite multimedia stream that includes the high quality video stream for the communicating participant, and the low quality video stream for the non-communicating participants. Thus, when the communicating participant changes, such as when a different participant begins speaking, the aforementioned delay may occur before the video stream of the presently communicating participant is broadcast in high quality within the composite multimedia stream.

The delay in broadcasting the video stream of the communicating participant in high quality may be noticeable to the third party viewers of the broadcast multimedia conference, because the third party viewers may not be accustomed to quality fluctuations in a broadcast video stream, and therefore may expect the communicating participant to always be broadcast in high quality. Thus, when a multimedia conference is being broadcast to third party viewers, the detriment associated with the delay in broadcasting the video stream of a communicating participant in high quality may outweigh the benefit of the bandwidth reduction achieved by causing the devices of non-communicating participants to transmit video streams in low quality.

As such, in order to minimize the delay in broadcasting a high quality video stream for a communicating participant, the server may send a control message to the device of each participant in the multimedia conference that indicates that the device should transmit a video stream at the highest quality the device is capable of, when a broadcast of the multimedia conference is initiated. Since the participants may be operating disparate devices, such as devices having different operating systems, different screen resolutions, different processing capabilities, etc., the highest quality video stream each device is capable of may differ for each participant's device. Therefore, the control message sent to the devices may reference a video quality that is relative to each device's capabilities, such as the highest quality video stream that the device is capable of, rather than referencing a fixed video quality. The control message may also indicate that the device should encode the video stream with a scalable video codec ("SVC"), such as the H.264 SVC, or generally any scalable video codec, if the device is not already encoding the video stream with such a codec. Alternatively, or in addition, the control message may effect scaling using other layered technology and/or other codecs, such as VP8 and related spatial, temporal, and video simulcast technology, to shape the bandwidth profile of the video and/or audio streams.

Video streams encoded with a scalable video codec, such as H.264 SVC, VP8, or generally any scalable video codec, may include a base layer and one or more enhancement layers. The base layer may be used to render the video stream with a particular video quality, such as a particular frame rate or resolution, and the enhancement layer may be used, in conjunction with the base layer, to render the video stream at a higher video quality, such as a higher frame rate or a higher resolution. The enhancement layer may only include the information required to render the video stream at the higher video quality, rather than including information for recreating the entire video stream. In this manner, a device receiving a video stream encoded with a scalable video codec may render the video stream at the quality level best suited for the capabilities of the device, such as the processing power of the device, the display size of the device, etc.

In regards to the multimedia conference broadcast, since the video streams of the participants are encoded with a scalable video codec, the broadcast server may broadcast the video stream of the communicating participant at high quality, i.e. using the base and enhancement layers, and the broadcast server may simultaneously broadcast the video stream of the non-communicating participants at a lower quality, i.e. using only the base layer. Further in this regard, by using the base and enhancement layers, the broadcast server may be able to change between broadcasting a given video stream in low quality (rendering the video stream using only the base layer) and broadcasting the given stream in high quality (rendering the video stream using the base and enhancement layers), without the delay associated with sending a control message to the device of the presently communicating participant indicating that the device should transmit a high quality video stream.

Accordingly, when a broadcast server determines a change in the communicating participant, the broadcast server may, in response, substantially immediately change the broadcast quality of the video stream of the presently communicating participant to high quality, such as using the base and enhancement layers, while the broadcast server may also substantially immediately change the broadcast quality of the video stream of the previously communicating participant to low quality, i.e. using only the base layer. As such, since a control message does not need to be sent to the device of the presently communicating user that indicates that the device should transmit a high quality video stream, there may be little or no noticeable delay in changing the quality of the video stream of a communicating participant.

Furthermore, since the video stream of every participant is transmitted in the highest quality the participant's device is capable of, a controlling participant of the broadcast of the multimedia conference may identify which participants' video streams should be broadcast in high quality, such as by using the base and enhancement layers, and which participants' video streams should be broadcast in low quality, such as by only using the base layer. Similarly, since the video stream of every participant is transmitted in the highest quality each participant's device is capable of, the server may record the video stream of each participant in high quality, and a user post-processing the broadcast of the multimedia conference may choose which participants' video streams should be shown in high quality, and which videos streams should be shown in low quality, in the post-processed video.

II. Example Network Environments for a Multimedia Conference Broadcast System

FIG. 1 illustrates an example network environment 100 which may implement a multimedia conference broadcast system. Not all of the depicted components may be required, however, and some implementations may include additional components not shown in the figure. Variations in the arrangement and type of the components may be made without departing from the spirit or scope of the claims as set forth herein. Additional, different or fewer components may be provided.

Network environment 100 may include a number of electronic devices 102, 104, 106 communicably connected to multimedia conference server 110 and/or broadcast server 116, such as by network 108. In another example, electronic devices 102, 104, 106 may be communicably connected to one another, such as by network 108, but not communicably connected to multimedia conference server 110 and/or broadcast server 116. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used to for displaying a web page or web application. In the example of FIG. 1, electronic device 102 is depicted as a smartphone, electronic device 104 is depicted as a desktop computer and electronic device 106 is depicted as a tablet device.

In one example, multimedia conference server 110 and broadcast server 116 include one or more processing devices 112 and one or more data stores 114. Processing device 112 executes computer instructions stored in data store 114, for example, to broadcast a multimedia conference to one or more of the electronic devices 102, 104, 106. Data store 114 may store the computer instructions on non-transitory computer-readable medium.

In one example, multimedia conference server 110 and/or broadcast server 116 may be a single computing device such as a computer server. In another example, multimedia conference server 110 and/or broadcast server 116 may represent multiple devices working together to perform the actions of a server computer (such as a cloud of computers and/or a distributed system). In another example, multimedia conference server 110 and/or broadcast server 116 may be coupled with various databases, storage services, or other computing devices. Multimedia conference server 110 and/or broadcast server 116, and the coupled databases, storage services, or other computing devices may be collocated, or may be disparately located. In one example, one or more of electronic devices 102, 104, 106 and/or multimedia conference server 110 may broadcast multimedia conferences. In this example, broadcast server 116 may not be included network environment 100.

Communications between electronic devices 102, 104, 106, multimedia conference server 110, and/or broadcast server 116 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106, multimedia conference server 110, and/or broadcast server 116. In another example, electronic devices 102, 104, 106 may be in communication with one another without communicating with multimedia conference server 110 and/or broadcast server 116.

Users interacting with electronic devices 102, 104, 106 may participate in a multimedia conference, or may receive a broadcast of a multimedia conference. The phrase "multimedia conference" or "multiway video conference" as used herein encompasses its plain and ordinary meaning and, if not otherwise included in its plain and ordinary meaning, may also refer to a conference that is participated in by one or more electronic devices 102, 104, 106, where each electronic device transmits an audio and/or video stream, and/or each electronic device receives an audio and/or video stream from at least one other of the electronic devices. Accordingly, the electronic devices 102, 104, 106, may include, or may be coupled to, a camera, or other device for capturing audio and/or video information, and may include one or more output devices for presenting audio and/or video information.

In one example, if users interacting with electronic devices 102, 104, 106 are participating in a multimedia conference that is hosted by a hosting device, such as multimedia conference server 110, electronic devices 102, 104, 106, may transmit audio streams and/or video streams to multimedia conference server 110. The phrase "hosting device" as used herein encompasses its plain and ordinary meaning and, if not otherwise included in its plain and ordinary meaning, may also refer to a device that is hosting, or otherwise providing, a multimedia conference. The hosting device, such as the server 110, may transmit the audio streams and/or video streams of each electronic device 102, 104, 106 to the other electronic devices 102, 104, 106.

The multimedia conference server 110 and/or broadcast server 116 may also transmit control signals, such as control information, to each of the electronic devices 102, 104, 106. The phrase "control information" as used herein encompasses its plain and ordinary meaning and may also refer to any information that relates to the control of the electronic devices 102, 104, 106. For example, the control information may include information pertaining to the quality level of the audio and/or video streams being transmitted by the electronic devices 102, 104, 106, such as a codec to be used to encode the audio and/or video streams, parameters to be used in encoding the audio and/or video streams, a frame rate of the video stream, a resolution of the video stream, a bit rate of the audio and/or video streams, an image quality of the video stream, or generally any information that may affect the quality of the audio and/or video streams. The electronic devices 102, 104, 106 may receive the control information and may change the quality level of their transmitted audio and/or video streams in accordance with the control information, as necessary.

In another example, the control information may include an indication of the quality level of the audio and/or video streams that is relative to the capabilities of each of the electronic devices 102, 104, 106. For example, the control information may include an indication that the audio and/or video streams should be transmitted at the highest quality level that the electronic devices 102, 104, 106 are capable of, at the lowest quality level that the electronic devices 102, 104, 106 are capable of, at a median quality level that the electronic devices 102, 104, 106 are capable of, or the control information may include any qualifier regarding the quality level of the audio and/or video streams for which a corresponding audio quality and/or video quality is known, or is determinable, by the electronic devices 102, 104, 106. The phrase "highest quality level that a device is capable of" as used herein encompasses its plain and ordinary meaning and may also refer to the highest quality level that a device can transmit an audio stream and/or a video stream based on one or more variables related to the operation of the device, such as the processing capabilities of the device, the resolution of an input device coupled to the device, such as a camera or a microphone, the bandwidth available to the device, or generally any other variable related to the operation of the device or the transmission of the audio and/or video streams from the device.

For example, if the user interacting with the electronic device 102 is a communicating participant of a multimedia conference, such as a speaking participant, the multimedia conference server 110 and/or broadcast server 116 may transmit control information to the electronic device 102 indicating that the device should transmit an audio stream and/or a video stream at a first quality level, such as high quality level or the highest quality level the device of capable of. The phrase "communicating participant," as used herein encompasses its plain and ordinary meaning and, if not otherwise included in its plain and ordinary meaning, may also refer to a participant in a multimedia conference who is presently speaking, presently performing sign language, or generally any participant presently communicating information to the other participants in any manner. If the users interacting with the electronic devices 104, 106 are non-communicating participants of the multimedia conference, such as not presently speaking, the multimedia conference server 110 and/or broadcast server 116 may transmit control information to the electronic devices 104, 106 indicating that the electronic devices 104, 106 should transmit audio and/or video streams at a second quality level, such as a quality level lower than the first quality level. The phrase "non-communicating participant" as used herein encompasses its plain and ordinary meaning and, if not otherwise included in its plain and ordinary meaning, may also refer to a participant in a multimedia conference who is not presently communicating with the other participants in the multimedia conference.

In one example, the quality of the audio and/or video streams associated with non-communicating participants may be optimized to reduce bandwidth and processing usage for the corresponding electronic devices 102, 104, 106, multimedia conference server 110 and/or broadcast server 116. If the user interacting with the electronic device 102 is no longer a communicating participant, such as the user stops speaking, and the user interacting with electronic device 104 becomes a communicating participant, such as the user starts speaking, the server 110 may transmit control information to the electronic device 102 indicating that the electronic device should transmit audio and/or video streams at the second quality level, such as a lower quality level, and the server 110 may transmit control information to the electronic device 104 indicating that the electronic device should transmit audio and/or video streams at the first quality level, such as a high quality level.

Therefore, when a user interacting with an electronic device 102 changes from a non-communicating participant to a communicating participant, there may be delay before the electronic device 102 transmits audio and/or video streams at the higher quality level. The delay may be a result of the time necessary for the multimedia conference server 110 and/or broadcast server 116 to determine that the user interacting with the electronic device 102 has started communicating and to transmit the appropriate control information to the electronic device 102. As a result of the delay, the other participants in the multimedia conference may receive low quality audio and/or video streams for a newly communicating participant until the electronic device 102 receives the control information from the multimedia conference server 110 and/or broadcast server 116 and begins transmitting high quality audio and/or video streams.

In one example, the broadcast server 116 may broadcast the multimedia conference to third party viewers interacting with electronic devices 102, 104, 106. The third party viewers of the broadcast may not be participants in the multimedia conference, although the participants in the multimedia conference may also receive the broadcast of the multimedia conference. The broadcast of the multimedia conference may be a composite multimedia stream that includes audio and/or video streams of one or more of the participants in the multimedia conference. In one example, the composite multimedia stream may be a container bitstream that includes the audio and/or video streams of the participant devices that are arranged in accordance with a determined layout. Alternatively, or in addition, the audio and/or video streams of the composite multimedia stream may be broadcasted as separate streams and/or may be broadcasted individually. An example composite multimedia stream is described in FIG. 8 below.

The broadcast of the multimedia conference may be transmitted by broadcast server 116, one of electronic devices 102, 104, 106, server 110, or by any other computing device that has access to the audio and/or video streams of one or more of the participants in the multimedia conference. The phrase "broadcasting device" or "broadcast server" as used herein encompasses its plain and ordinary meaning and, if not otherwise included in its plain and ordinary meaning, may also refer to any electronic device that is capable of transmitting a composite multimedia stream to one or more other devices.

In one example, multimedia conference server 110 may generate a composite multimedia stream using the audio and/or video streams received from the participant devices, and the multimedia conference server 110 may broadcast the composite multimedia stream to one or more viewer devices. The process of broadcasting the multimedia conference by the multimedia conference server 110 is discussed in FIG. 2 below. Alternatively, or in addition, a server that is not hosting the multimedia conference, such as broadcast server 116, may join, or connect to, the multimedia conference as a non-participant device. The broadcast server 116 may then receive the audio and/or video streams of each of the participant devices, such as electronic devices 102, 104, 106, through its connection to the multimedia conference as a non-participant device. However, broadcast server 116 may not provide a video stream and/or an audio stream to the participant devices in the multimedia conference. Broadcast server 116 may generate a composite multimedia stream using the video and/or audio streams received from the participant devices, and may broadcast the composite multimedia stream to one or more viewer devices. The process of broadcasting the multimedia conference by the broadcast server 116 is discussed in FIG. 4 below.

The phrase "non-participant device" as used herein encompasses its plain and ordinary meaning and, if not otherwise included in its plain and ordinary meaning, may also refer to any electronic device that receives audio and/or video streams associated with a multimedia conference through a connection to the multimedia conference, such as a connection established by joining the multimedia conference using the same protocol that is used by a participant device to join the multimedia conference, but does not provide any audio and/or video streams to the participant devices in the multimedia conference and/or does not otherwise participate in the multimedia conference. In one example, non-participant devices may not be included in the list of participants in the multimedia conference that is provided to the participant devices in the multimedia conference. Alternatively, non-participant devices may be included in the list of participants in the multimedia conference.

The multimedia conference server 110 and/or the broadcast server 116 may provide a user interface to one or more of the electronic devices 102, 104, 106 that are participant devices in the multimedia conference. The user interface may allow the participant device, such as electronic devices 102, 104, 106, to control characteristics of the composite multimedia stream, such as the layout of the composite multimedia stream, irrespective of the processing capabilities and/or bandwidth availability associated with the participant device. A participant device that has received the user interface may be referred to as a controlling device and a user interacting with a controlling device may be referred to as a controlling participant. The user interface may allow a controlling participant to control the number of pixels allocated to each of the video streams in the composite multimedia stream, to control the position of each of the video streams in the composite multimedia stream, to control the volume level of the audio streams in the composite multimedia stream, to control the quality of each of the audio streams and/or video streams, or generally to control any characteristic of the audio and/or video streams in the composite multimedia stream. An example user interface that may be provided to a participant device to allow the participant device to control the layout of a composite multimedia stream is described in FIG. 7 below. The phrase "controlling participant" and "controlling device" as used herein encompasses its plain and ordinary meaning and, if not otherwise included in its plain and ordinary meaning, may also refer to any user and device, respectively, that has control over one or more characteristics of the composite multimedia stream, or has been provided with the ability to control one or more characteristics of the composite multimedia stream. An example process of a controlling device that is controlling characteristics of a composite multimedia stream that is being broadcast is described in FIG. 3 below.

When a broadcast of a multimedia conference is initiated, multimedia conference server 110 and/or broadcast server 116 may signal control information to participant devices of the multimedia conference, such as electronic devices 102, 104, 106, that indicates that electronic devices 102, 104, 106 should transmit audio and/or video streams at the highest quality each electronic device 102, 104, 106 is capable of. An example process for initiating the broadcast of a multimedia conference is described in FIG. 6 below. Alternatively, multimedia conference server 110 and/or broadcast server 116 may signal the control information during an already occurring broadcast of a multimedia conference. As mentioned above, the highest quality audio and/or video stream that each electronic device 102, 104, 106 is capable of transmitting may be dependent upon, or relative to, the capabilities of each of the electronic devices 102, 104, 106.

Alternatively, or in addition, the control information may include values corresponding to one or more variables associated with the quality of the audio and/or video streams, such as values for the frame rate or resolution of the video stream, or bit rate of the audio and/or video streams. The control information may also indicate that the electronic devices 102, 104, 106 should encode the video streams with a scalable video codec that encodes video streams with a base layer and at least one enhancement layer, such as the H.264 SVC. In one example, the video streams may be encoded with multiple enhancement layers, where each enhancement layer corresponds to an increased quality level of the video stream, such as increased resolution, frame rate, or bit rate. Alternatively, or in addition, the audio streams may also be encoded with a base layer and at least one enhancement layer.

Electronic devices 102, 104, 106 may receive the control information from multimedia conference server 110 and/or broadcast server 116 and may begin transmitting audio and/or video streams at the quality level indicated by the control information, such as at the highest quality level each electronic device 102, 104, 106 is capable of. The multimedia conference server 110 may receive the audio and/or video streams of each of electronic devices 102, 104, 106, and may transmit the audio and/or video streams of each electronic device 102, 104, 106 to the other electronic devices 102, 104, 106, such as by using the base and enhancement layers, or using only the base layer. The multimedia conference server 110 and/or broadcast server 116 may broadcast the audio and/or video streams of each electronic device 102, 104, 106 to the third party viewers as a composite multimedia stream, such as by using the base and enhancement layers, or using only the base layer. The transmission of the audio and/or video streams to electronic devices 102, 104, 106 that are accessed by participants in the multimedia conference may be separate from, and/or independent of, the broadcast of the multimedia conference to electronic devices 102, 104, 106 accessed by third party viewers.

Since audio and/or video streams received by the multimedia conference server 110 and/or broadcast server 116 from electronic devices 102, 104, 106 may be encoded with a base layer and an enhancement layer, the multimedia conference server 110 and/or broadcast server 116 may substantially immediately broadcast high quality audio and/or video streams for a given participant, such as using the base layer and enhancement layer, such as in response to determining that the participant has changed from a non-communicating participant to a communicating participant. Accordingly, multimedia conference server 110 and/or broadcast server 116 may begin broadcasting high quality audio and/or video streams associated with a newly communicating participant without having to transmit any control information to the electronic device, such as electronic device 102, of the newly communicating participant. Thus, multimedia conference server 110 and/or broadcast server may substantially immediately broadcast high quality audio and/or video streams, such as using the base and enhancement layers of the video stream and/or audio streams, or low quality video, such as using only the base layer of the video stream and/or audio streams, independent of, and irrespective of, any control signaling between multimedia conference server 110 and/or broadcast server 116 and electronic devices 102, 104, 106. The broadcast of high quality audio and/or video streams for a newly communicating participant is discussed in more detail in FIG. 5 below.

III. Example Processes for a Multimedia Conference Broadcast System

Figure 2:
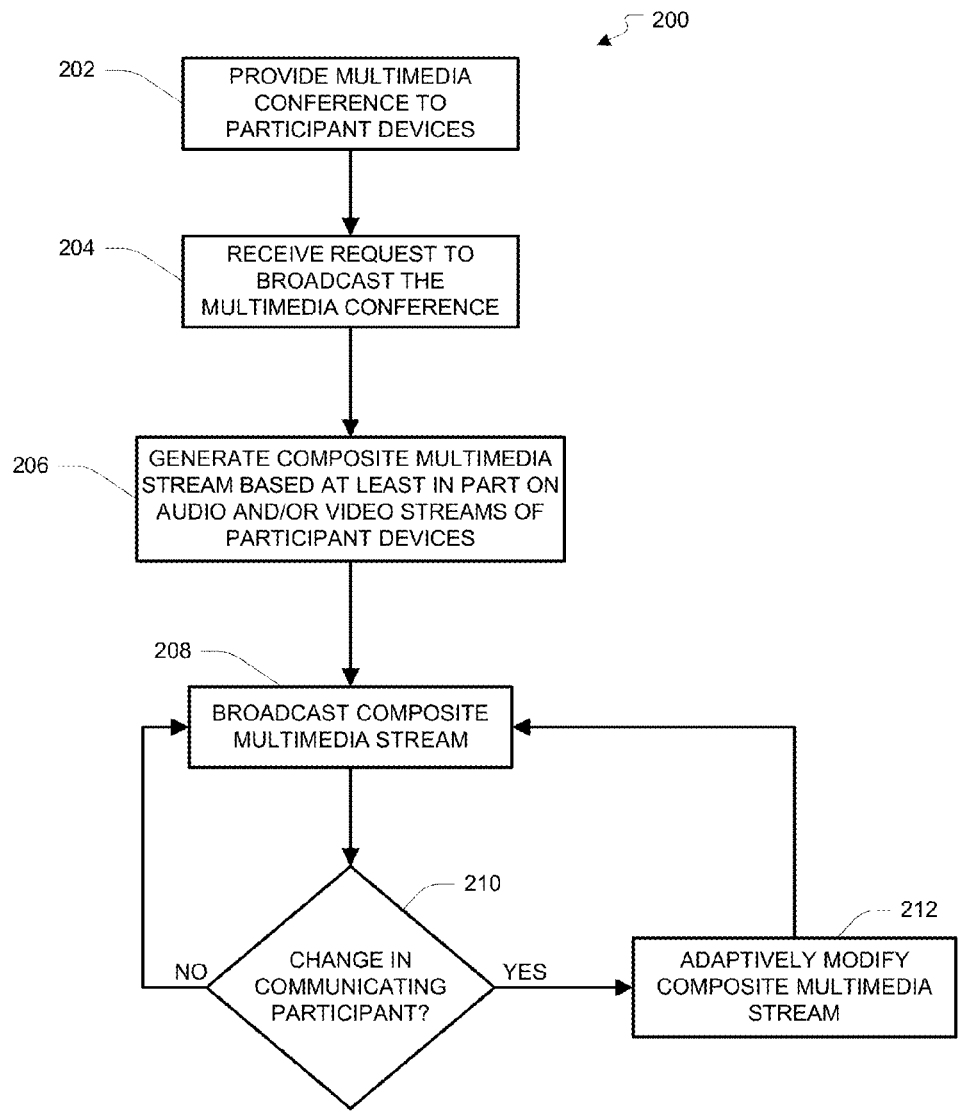
FIG. 2 illustrates a flow diagram of an example process for a multimedia conference broadcast system.

FIG. 2 illustrates a flow diagram of an example process 200 for a multimedia conference broadcast system. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel.

In block 202, multimedia conference server 110 provides a multimedia conference to participant devices, such as electronic devices 102, 104. For example, multimedia conference server 110 may receive audio and/or video streams from one or more of electronic devices 102, 104, and may provide the received audio and/or video streams to the other of the electronic devices 102, 104. In block 204, multimedia conference server 110 receives a request to broadcast the multimedia conference, such as from one of electronic devices 102, 104. For example, multimedia conference server 110 may provide a control to one or more of electronic devices 102, 104, that allows the one or more of the electronic devices 102, 104 to request a broadcast of the multimedia conference.

In one example, multimedia conference server 110 may request authorization for the broadcast of the multimedia conference from each of the participants in the multimedia conference when the participants join the multimedia conference, i.e. before allowing a request for broadcast of the multimedia conference. Alternatively, or in addition, multimedia conference server 110 may request authorization for the broadcast of the multimedia conference from each of the participants when the request to broadcast the multimedia conference is received. In one example, the multimedia conference server 110 may exclude the audio and/or video streams from the broadcast for any of participants that did not authorize the broadcast of the multimedia conference.

In block 206, multimedia conference server 110 and/or broadcast server 116 generates a composite multimedia stream based at least in part on the audio and/or video streams of the participant devices in the multimedia conference, such as electronic devices 102, 104. For example, multimedia conference server 110 and/or broadcast server 116 may determine a layout for the composite multimedia stream based on whether users interacting with the participant devices are presently communicating. Multimedia conference server 110 and/or broadcast server 116 may allocate a larger number of pixels in the composite multimedia stream for video streams corresponding to communicating users than those corresponding to non-communicating users. Alternatively, or in addition, multimedia conference server 110 and/or broadcast server 116 may include the audio streams corresponding to communicating users in the composite multimedia stream at a higher volume than audio streams corresponding to non-communicating users.

In one instance, multimedia conference server 110 may generate the composite multimedia stream using the audio and/or video streams that are received from the participant devices for the multimedia conference. In another example, multimedia conference server 110 and/or broadcast server 116 may join the multimedia conference as a non-participant device. In this example, the multimedia conference server 110 and/or broadcast server 116 may receive the audio and/or video streams of the participant devices through the connection to the multimedia conference as a non-participant device.

In block 208, multimedia conference server 110 and/or broadcast server 116 broadcasts the composite multimedia stream to one or more viewer devices, such as electronic device 106. In one example, the viewer devices may be distinct from the participant devices. Alternatively, or in addition, a participant device may receive the composite multimedia stream. For example, broadcast server 116 may broadcast the composite multimedia stream through an existing content distribution network, by publishing a network resource locator for accessing the broadcast, such as a uniform resource locator (URL), or through any other means of broadcasting a multimedia stream. The broadcast may be access controlled, such as by associating the broadcast with a login and/or password, limiting the number of concurrent viewers of the broadcast, authorizing individual viewers, or groups of viewers, to view the broadcast, such as in a social network, or generally any form of controlling access to the broadcast.

In block 210, multimedia conference server 110 and/or broadcast server 116 determines whether the communicating participant(s) have changed. For example, multimedia conference server 110 and/or broadcast server 116 may determine whether a previously communicating participant has stopped communicating and/or whether a previously non-communicating participant has started communicating, such as by processing the audio and/or video streams corresponding to the participants. If, in block 210, multimedia conference server 110 and/or broadcast server 116 determines that a change in the communicating participant(s) has not occurred, multimedia conference server 110 and/or broadcast server 116 return to block 208 and continue to broadcast the composite multimedia stream.

If, in block 210, multimedia conference server 110 and/or broadcast server 116 determines that a change in the communicating participant(s) has occurred, multimedia conference server 110 and/or broadcast server 116 moves to block 212. In block 212, multimedia conference server 110 and/or broadcast server 116 adaptively modifies the composite multimedia stream, such as the layout of the video streams in the composite multimedia stream, in response to the change in the communicating participant(s). For example, if a previously non-communicating participant starts communicating, multimedia conference server 110 and/or broadcast server 116 may increase the number of pixels allocated to the video stream of the participant. Alternatively, or in addition, if a previously communicating participant stops communicating, multimedia conference server 110 and/or broadcast server 116 may decrease the number of pixels allocated to the video stream of the participant. Multimedia conference server 110 and/or broadcast server 116 may then return to block 208 and continue broadcasting the composite multimedia stream.

Figure 3:
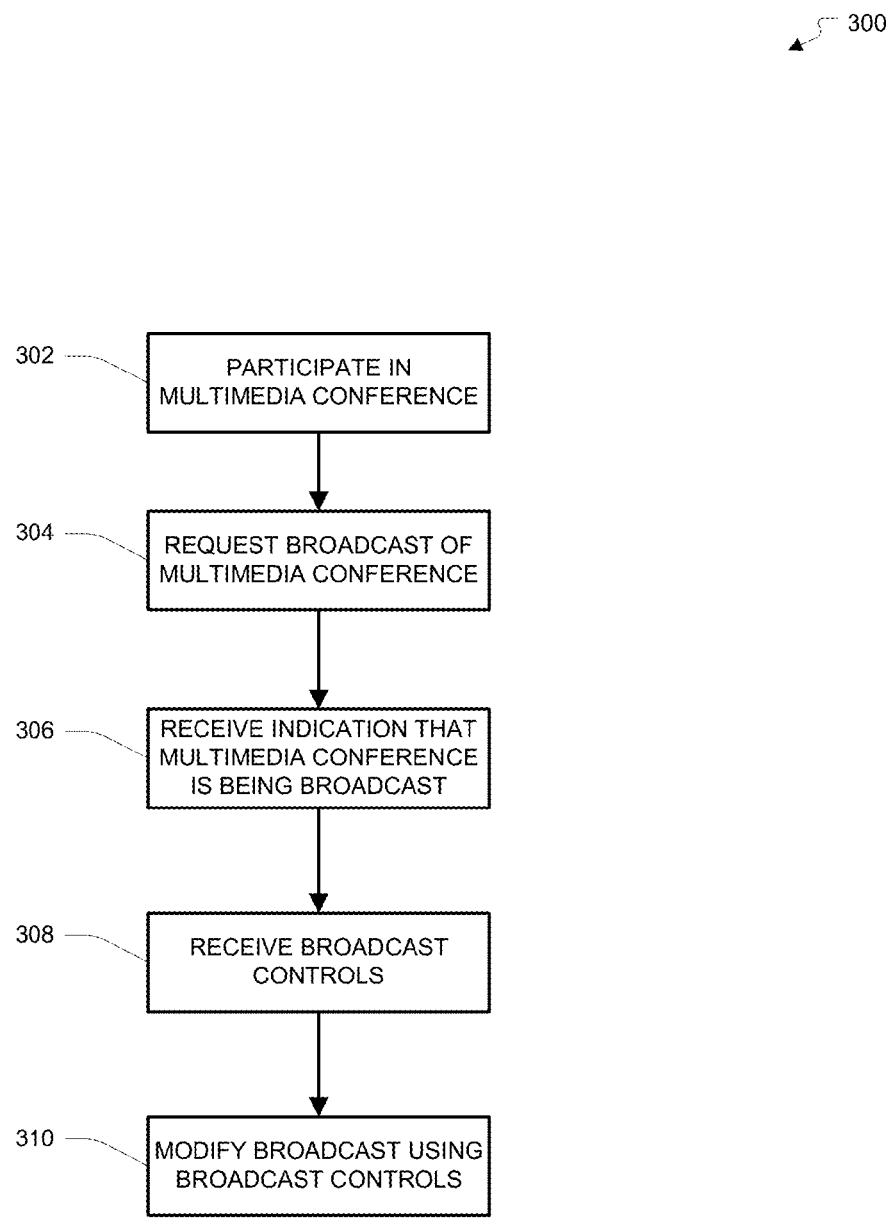
FIG. 3 illustrates a flow diagram of an example process for a participant device in a multimedia conference broadcast system.

FIG. 3 illustrates a flow diagram of an example process 300 for a participant device in a multimedia conference broadcast system. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel.

In block 302, a participant device, such as electronic device 102, participates in a multimedia conference, such as a multimedia conference provided by multimedia conference server 110. In block 304, the participant device, such as electronic device 102, requests that the multimedia conference be broadcast. For example, a user interacting with electronic device 102 may access a control, such as a button, to transmit a request for broadcast of the multimedia conference to multimedia conference server 110. In one example, the control for transmitting the request for broadcast of the multimedia conference may only be available when all of the participants in the multimedia conference have previously authorized a broadcast of the multimedia conference.

In block 306, the participant device, such as electronic device 102, receives an indication that the multimedia conference is being broadcast. For example, multimedia conference server 110 and/or broadcast server 116 may transmit a notification to the participant device that indicates that the multimedia conference is being broadcast. In block 308, the participant device that requested the broadcast of the multimedia conference receives broadcast controls for controlling the composite multimedia stream being broadcast, such as by controlling the layout of the composite multimedia stream. The broadcast controls may allow a user interacting with the participant device to control and/or modify one or more characteristics of the composite multimedia stream, such as the layout and/or size of the video streams in the composite multimedia stream, the quality of the audio and/or video streams in the composite multimedia stream, or generally any characteristics of the audio and/or video streams in the composite multimedia stream. Example broadcast controls are described in FIG. 7 below.

In block 310, the composite multimedia stream being broadcasted is modified, such as by a user interacting with the broadcast controls that were provided to the participant device in block 308. For example, a user interacting with the participant device may use the broadcast controls to change the layout and/or size of the video streams in the composite multimedia stream, to change the quality of the audio and/or video streams of each of the participants in the composite multimedia stream, or generally to change any characteristics of the composite multimedia stream. In one example, the participant device may transmit an indication of the modifications to the composite multimedia stream to multimedia conference server 110 and/or broadcast server 116. Multimedia conference server 110 and/or broadcast server 116 may modify the composite multimedia stream being broadcasted in accordance with the changes received from the participant device.

Figure 4:
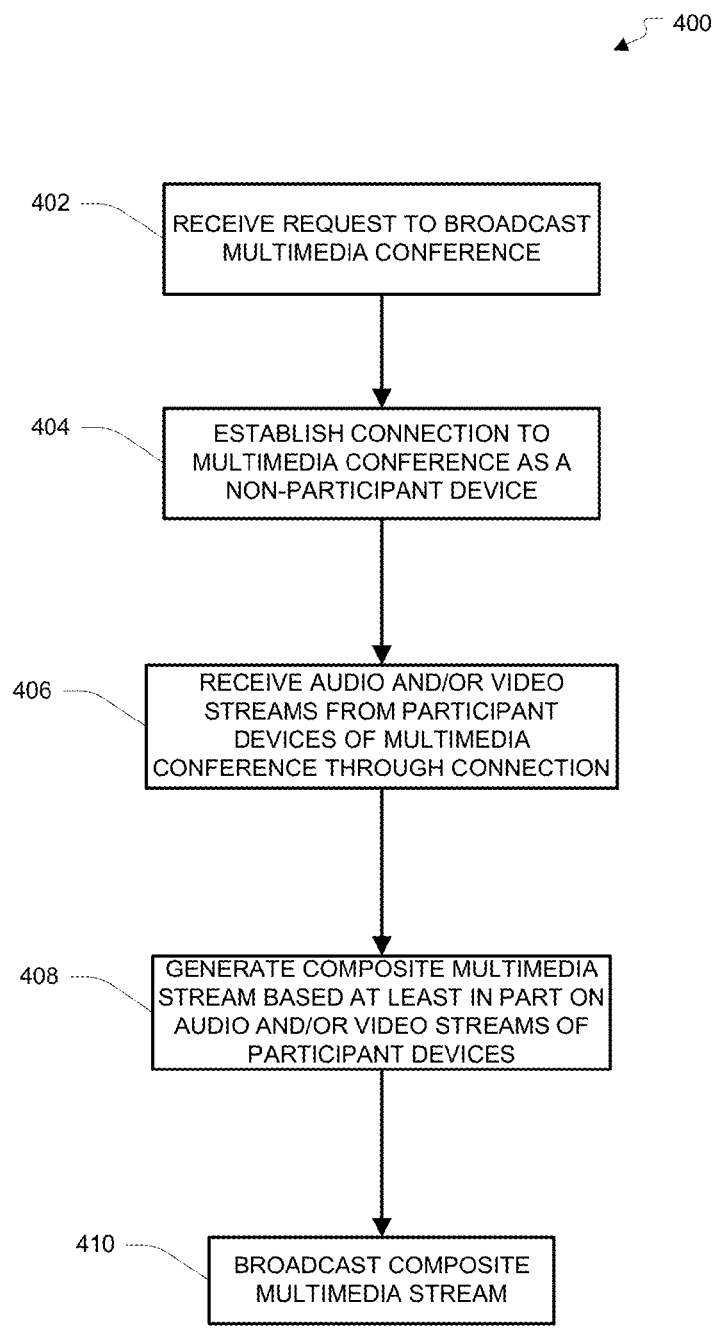
FIG. 4 illustrates a flow diagram of an example process for a multimedia conference broadcast system.

FIG. 4 illustrates a flow diagram of an example process for a multimedia conference broadcast system. For explanatory purposes, example process 400 is described herein with reference to the example network environment 100 of FIG. 1; however, example process 400 is not limited to the example network environment 100 of FIG. 1. Further for explanatory purposes, the blocks of example process 400 are described herein as occurring in serial, or linearly. However, multiple blocks of example process 400 may occur in parallel.

In block 402, broadcast server 116 receives a request to broadcast a multimedia conference. For example, multimedia conference server 110 may receive a request to broadcast a multimedia conference, such as from one of the participant devices of the multimedia conference, and multimedia conference server 110 may transmit and/or forward the received request to broadcast server 116. Alternatively, or in addition, broadcast server 116 may receive a request directly from one of the participant devices. In block 404, broadcast server 116 establishes a connection to the multimedia conference as a non-participant device. In one example, a device, such as broadcast server 116, may establish a connection to the multimedia conference as a non-participant device using the same protocol as devices that connect to the multimedia conference as participant devices. However, non-participant devices may transmit an indication to multimedia conference server 110 that indicates that they have joined the multimedia conference in a non-participating capacity.

In block 406, broadcast server 116 receives audio and/or video streams from the participant devices in the multimedia conference, such as through the connection to the multimedia conference established by the broadcast server 116. In block 408, broadcast server 116 may generate a composite multimedia stream based on the audio and/or video streams received from the participant devices. For example, broadcast server 116 may determine a layout of the video streams of the participant devices in the composite multimedia stream based at least in part on whether users interacting with the participant devices are presently communicating. In block 410, broadcast server 116 broadcasts the composite multimedia stream to one or more viewer devices. In one example, the one or more viewer devices may be distinct from the participant devices of the multimedia conference.

Figure 5:
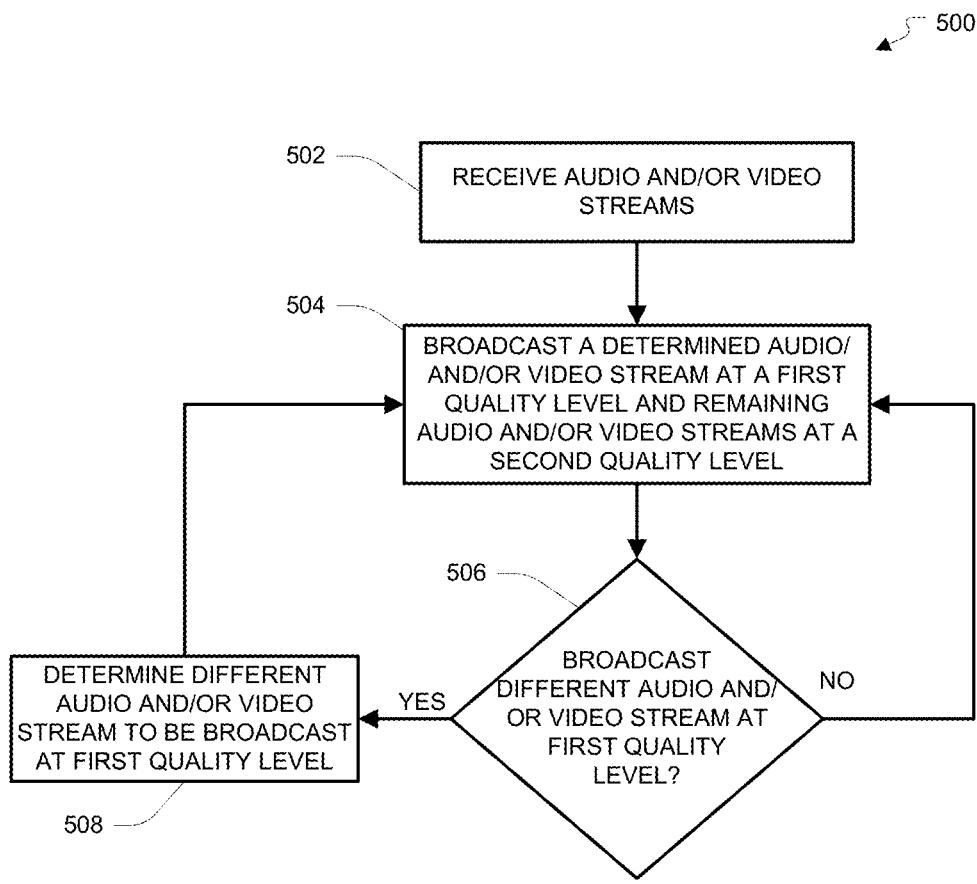
FIG. 5 illustrates a flow diagram of an example process of a multimedia conference broadcast system.

FIG. 5 illustrates a flow diagram of an example process 500 of a multimedia conference broadcast system. For explanatory purposes, example process 500 is described herein with reference to the example network environment 100 of FIG. 1; however, example process 500 is not limited to the example network environment 100 of FIG. 1. Further for explanatory purposes, the blocks of example process 500 are described herein as occurring in serial, or linearly. However, multiple blocks of example process 500 may occur in parallel.

In block 502, a broadcasting device, such as one or more of the electronic devices 102, 104, 106, multimedia conference server 110, or broadcast server 116, receives audio and/or video streams from one or more devices of the participants in a multimedia conference. In one example, the devices of the participant may transmit the audio and/or video streams at the highest quality level that each device is capable of. Alternatively, or in addition, the audio and/or video streams may be encoded using a scalable codec, such as a scalable video codec or a scalable video codec, such that each audio and/or video stream includes a base layer and an enhancement layer.

In block 504, the broadcasting device broadcasts a composite multimedia stream that includes at least some of the received audio and/or video streams. The composite multimedia stream may include one of the received audio and/or video streams, such as an audio and/or video stream associated with a communicating participant, at a first quality level, such as a high quality level. Alternatively, or in addition, the composite multimedia stream may include the remaining audio and/or video streams, such as the audio and/or video streams associated with the non-communicating participants, at a second quality level with the composite multimedia stream, such as a low quality level. In one example, the second quality level may be lower than the first quality level. In the instance where the audio and/or video streams include a base layer and an enhancement layer, the broadcasting device may broadcast the determined audio and/or video streams at the high quality level by using both the base and enhancement layers of the audio and/or video streams, and the broadcasting device may broadcast the remaining audio and/or video streams at the low quality level by using only the base layer of the audio and/or video streams.

In block 506, the broadcasting device determines whether a different, or another, audio and/or video stream should be broadcast within the composite multimedia stream at the first quality level, such as the high quality level. For example, the broadcasting device may determine that a participant associated with another audio and/or video stream has started communicating, the broadcasting device may determine that the previously communicating participant is no longer communicating, or the broadcasting device may receive an indication that the audio and/or video streams associated with another participant should be transmitted at the first quality level. If, at block 506, the broadcasting device does not determine that a different, or another, audio and/or video stream should be broadcast within the composite multimedia stream at the first quality level, the broadcasting device returns to block 504.

If, at block 506, the broadcasting device determines that a different, or another, audio and/or video stream should be broadcast within the composite multimedia stream at the first quality level, then the broadcast device proceeds to block 508. At block 508, the broadcasting device determines, or identifies, a different, or another, audio and/or video stream that should be broadcast at the first quality level. The broadcasting device then returns to block 504. At block 504, the broadcasting device starts broadcasting the newly determined audio and/or video stream at the first quality level within the composite multimedia stream, and broadcasting the remaining audio and/or video streams at the second quality level within the composite multimedia stream. In one example, the broadcasting device may broadcast more than one audio and/or video stream at the first quality level within the composite multimedia stream, and the broadcasting device may broadcast only one audio and/or video stream at the second quality level within the composite multimedia stream.

For example, if the audio and/or video streams include a base layer and an enhancement layer, the broadcasting device may start broadcasting the newly determined audio and/or video streams using both the base and enhancement layers. Since the broadcasting device may receive the audio and/or video stream of the participants with a base and an enhancement layer, the broadcasting device may substantially immediately include the newly determined audio and/or video streams at the first quality level within the composite multimedia stream, such as by using both the base and enhancement layer. As such, the broadcasting device can broadcast audio and/or video streams for any of the participants at the first or second quality levels within the composite multimedia stream independent of, and irrespective of, any control signaling transmitted to the devices of the participants, since the broadcasting device receives audio and/or video streams from the participant devices that can be used to render the audio and/or video stream at both the first quality level, such as by using the base and enhancement layers, or at the second quality level, such as by using only the base layer.

Further in this regard, the broadcasting device can broadcast audio and/or video streams for any of the participants at the first or second quality level within the composite multimedia stream using the base and/or enhancement layers without transcoding, or further processing, the received audio and/or video streams. Thus, the broadcasting device may broadcast audio and/or video streams for any of the participants at the first or second quality level within the composite multimedia stream independent of, and irrespective of, any transcoding of the video streams.

Figure 6:
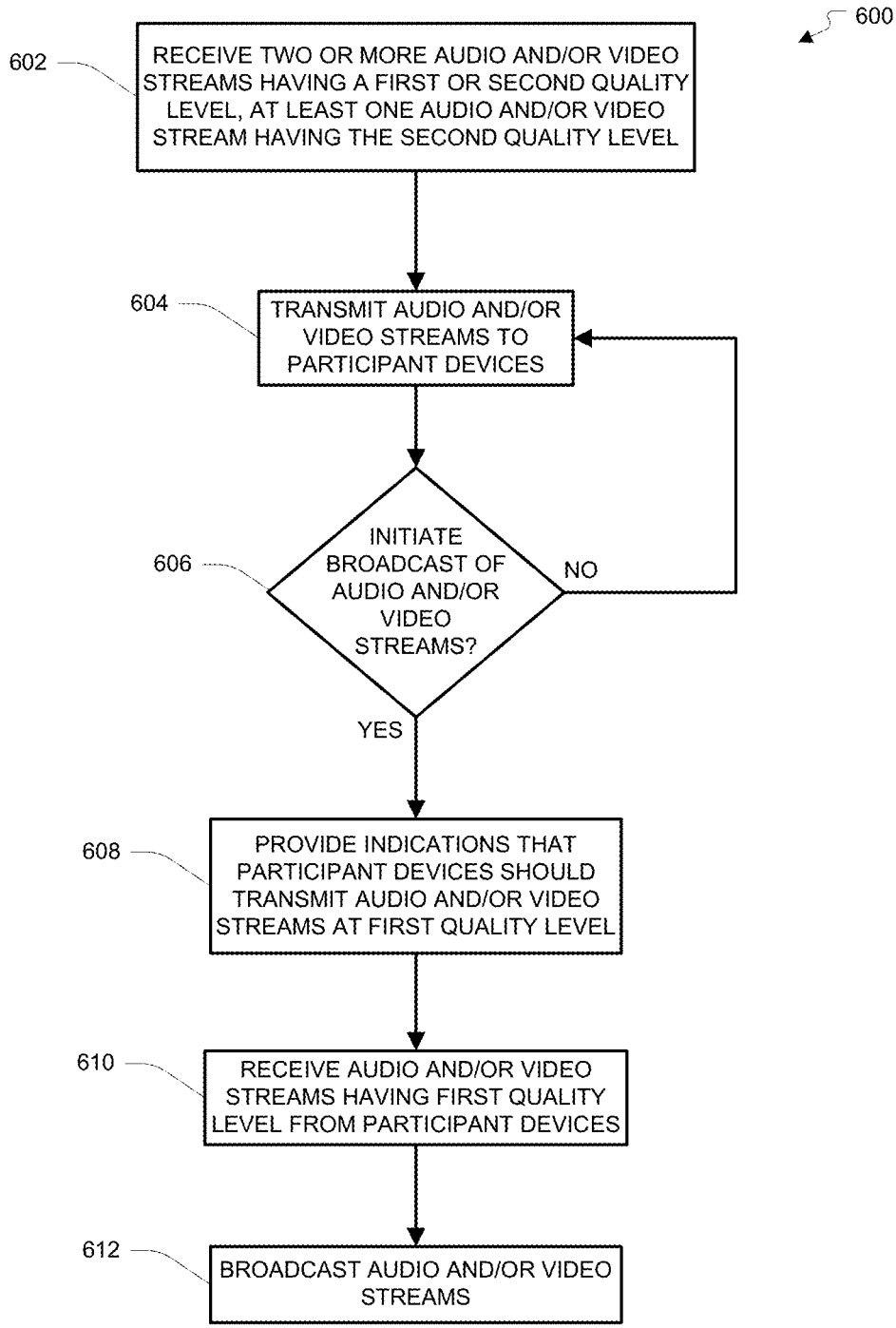
FIG. 6 illustrates a flow diagram of an example process for initiating a multimedia conference broadcast in a multimedia conference broadcast system.

FIG. 6 illustrates a flow diagram of an example process 600 for initiating a broadcast of a multimedia conference. For explanatory purposes, example process 600 is described herein with reference to the example network environment 100 of FIG. 1; however, example process 600 is not limited to the example network environment 100 of FIG. 1. Further for explanatory purposes, the blocks of example process 600 are described herein as occurring in serial, or linearly. However, multiple blocks of example process 600 may occur in parallel.

In block 602, a hosting device of a multimedia conference, such as one or more of multimedia conference server 110, broadcast server 116, or electronic devices 102, 104, 106, may receive audio and/or video streams from one or more participants of the multimedia conference, such as one or more audio and/or video streams having a first or second quality level, with at least one of the audio and/or video streams having the second quality level. For example, the first quality level may be higher than the second quality level, and audio and/or video streams of communicating participants may be received at the first quality level, while audio and/or video streams of non-communicating participants may be received at the second quality level. If a participant in the multimedia conference is determined to have changed from a communicating participant to a non-communicating participant, the multimedia conference server 110 may signal control information to the device of the participant indicating that the device should start transmitting audio and/or video streams at the second quality level. Conversely, if a participant in the multimedia conference is determined to have changed from a non-communicating participant to a communicating participant, the server 110 may signal control information to the device of the participant indicating that the device should start transmitting audio and/or video streams at the first quality level.

At block 604, the hosting device transmits the audio and/or video streams received from the device of each participant to the devices of each of the other participants in the multimedia conference. At block 606, the hosting device determines whether to initiate a broadcast of the received audio and/or video streams of the multimedia conference, such as to third party viewers.

There may be several mechanisms for triggering the initiation of the broadcast of the multimedia conference. For example, a participant in the multimedia conference may select a setting to initiate the broadcast of the multimedia conference, the system may suggest to a user to initiate a broadcast of a multimedia conference if the amount of available bandwidth satisfies a threshold, or based on the country or region of origin where one or more of the participants, or the hosting device, are located. In another example, a participant of the multimedia conference may be allowed to initiate a broadcast of the multimedia conference if one or more of the participants satisfies a metric derived from a social network, such as the number of followers one of the participants has, the number of followers the participants collectively have, or generally any metric relating to the popularity of one or more of the participants of the multimedia conference. In another example, the system may use heuristics based on one or more of the aforementioned examples, and may present a setting to one of the participants that allows the participant to initiate the broadcast of the multimedia conference, or to select an option to automatically initiate the broadcast the multimedia conference with an option to opt-out.

Alternatively, or in addition, a multimedia conference may have been previously initiated and may be presently occurring. In this example, at block 606 a broadcasting device, such as one or more of multimedia conference server 110, broadcast server 116, or electronic devices 102, 104, 106, may determine whether to initiate a broadcast optimized mode for the presently occurring broadcast of the multimedia conference, rather than determining whether to initiate the broadcast of the multimedia conference.

There may be several mechanisms for triggering the broadcast optimized mode. For example, a user interacting with the broadcasting device, such as a controlling user, may select to enter the broadcast optimized mode via a setting, such as a setting in an application facilitating the multimedia conference. The application setting may only be available if one or more of the participants satisfies a metric derived from a social network, such as the number of followers one of the participants has, the number of followers the participants collectively have, or generally any metric relating to the popularity of one or more of the participants of the multimedia conference. In another example, the hosting device or broadcasting device may automatically enter the broadcast optimized mode when the device determines that the broadcast is occurring and that one or more bandwidth thresholds are satisfied, as observed from the server or client side. In another example, the broadcast optimized mode may be automatically initiated based on the country or region of origin of one or more of the participants, or of the hosting device. In another example, the system may use heuristics based on one or more of the aforementioned examples, and may present a setting to one or more the participants that allows the participant to initiate the broadcast optimized mode, or that allows the participant to select to automatically initiate the broadcast optimized mode with an option to opt-out.

In another example, the broadcast or the broadcast optimized mode may be deactivated if the criteria of one or more of the aforementioned mechanisms is no longer satisfied. Alternatively, or in addition, a participant in the multimedia conference may deactivate the broadcast or the broadcast optimized mode.

If, at block 606, the hosting device determines that a broadcast of the video streams of the multimedia conference has been initiated, or that a broadcast is ongoing and the broadcast optimized mode has been initiated, the hosting device moves to block 608. At block 608, the hosting device transmits an indication to the devices of the participants of the multimedia conference indicating that the devices should transmit audio and/or video streams at the second quality level, for example the highest quality level that the devices are capable of transmitting. The indication may be signaled as part of control information transmitted to the devices of the participants. In one example, the indication may be transmitted to each of the devices simultaneously. Alternatively, or in addition, the indication may be transmitted to each device individually, such as based on whether the user interacting with the device is a communicating participant. Alternatively, or in addition, the indication may be transmitted to the devices of a number of the most recently communicating participants.

In one example, the control information transmitted to the devices may include one or more values relating to the quality level of the audio and/or video streams. For example, the control information may include a frame rate of the video stream, a resolution of the video stream, a bit rate of the audio and/or video streams, or parameters for tuning the codec used to encode the audio and/or video streams.

In another example, if there is not enough bandwidth to receive high quality audio and/or video streams from each of the participants, the control information may indicate that the non-visible or non-communicating participants should not send an audio and/or video stream to the hosting device. Alternatively, or in addition, the hosting device may not transmit the audio and/or video streams for non-visible or non-communicating participants to the broadcasting device, or the hosting device may transmit a reduced quality audio and/or video stream for non-visible or non-communicating participants to the broadcasting device.

In another example, the control information transmitted to the devices may also include information pertaining particularly to the quality of the audio streams transmitted by the devices. For example, the control information may include parameters for tuning the audio codec to based on the type, or content, of audio being transmitted, such as speech, conversations, music, or generally any type of audio. The parameters may be applied to the audio codec at the cost of increased bandwidth usage. In this regard, if bandwidth is limited the quality of non-communicating participants may be reduced, or the hosting device may not receive audio from the non-communicating participants.

The hosting device or broadcasting device may also process or transcode a received audio stream to improve the quality of the audio stream. For example, the server may perform noise reduction, echo cancellation, or similar enhancements that may result in a higher quality audio stream being broadcast. The audio processing or transcoding may also be performed the devices of the participants, or of the third party viewers, at the cost of increased bandwidth or processor usage.

At block 610, the hosting device may receive audio and/or video streams having the first quality level from the device of each participant. At block 612, the hosting device may broadcast the audio and/or video streams of the participants at the first or second quality level. For example, a composite multimedia stream including audio and/or video streams of one or more of the participants may be broadcast to devices of third party viewers. Alternatively, the hosting device may transmit the audio and/or video streams to a broadcasting device, such as broadcast server 116, and the broadcasting device may broadcast the composite multimedia stream to the devices of the third party viewers. Alternatively, a broadcasting device, such as broadcast server 116, may connect to, or join, the multimedia conference as a non-participant device and may receive the audio and/or video streams corresponding to the participants in the multimedia conference through the connection to the multimedia conference.

In one example, the hosting device or the broadcasting device may individually record the audio and/or video streams of each of the participants at the first quality level, such as a high quality level. The audio and/or video streams may then be post-processed and composited into a new recording that shows each of the participants at the first quality level, irrespective of whether the participant was broadcast at the first quality level.

In another example, the hosting device or the broadcasting device may record the composite multimedia stream of the broadcast and may allow a user to edit the composite multimedia stream in real-time, such as by allowing the user to select which participants should be in-focus and which participants should be broadcast at the high quality level, irrespective of whether the participants are presently communicating. For example, it may be desirable to broadcast a non-communicating participant at a high quality level in order to view the non-communicating participant's reaction to a communicating participant.

IV. Example User Interfaces for a Multimedia Conference Broadcast System

Figure 7:
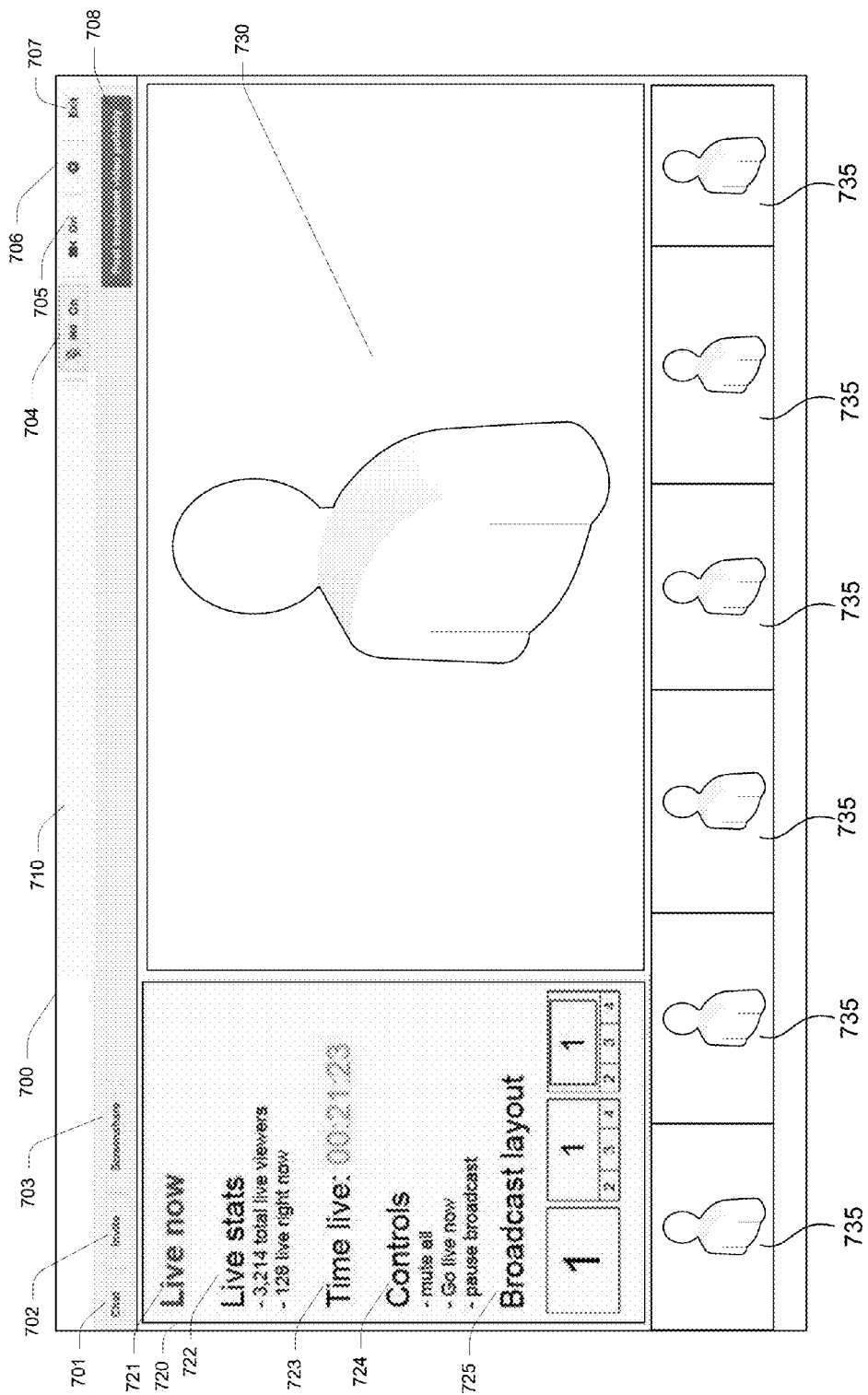
FIG. 7 illustrates an example user interface for a multimedia conference broadcast system.

FIG. 7 illustrates an example user interface 700 for a multimedia conference broadcast system. Not all of the depicted components may be required, however, and some implementations may include additional components not shown in the figure. Variations in the arrangement and type of the components may be made without departing from the spirit or scope of the claims as set forth herein. Additional, different or fewer components may be provided.

User interface 700 includes a general controls section 710, a broadcast controls section 720, a main participant display 730 and auxiliary participant displays 735. The general controls section 710 includes a chat selector 701, an invite selector 702, a screenshare selector 703, an audio selector 704, a video selector 705, a preferences selector 706, an exit selector 707, and a post broadcast selector 708. The broadcast controls section 720 includes a broadcast indicator 721, broadcast metrics 722, broadcast time 723, broadcast controls 724, and broadcast layout controls 725.

In operation, user interface 700 may be provided by the multimedia conference server 110 to one of the electronic devices 102, 104, 106, such as electronic device 102. A user interacting with electronic device 102 may participate in a multimedia conference provided by the multimedia conference server 110. For example, the main participant display 730 may display a video stream of a communicating participant in the multimedia conference, while the auxiliary participant displays 735 may display video streams of non-communicating participants in the multimedia conference. Alternatively, or in addition, the user may select any of the video streams to be displayed in the main participant display 730.

The user interacting with electronic device 102 may also control the composite multimedia stream being broadcast for the multimedia conference by using the broadcast controls section 720. For example, the broadcast indicator 721 may indicate whether the multimedia conference is presently being broadcast, the broadcast metrics may indicate how many total viewers have viewed the broadcast in addition to how many viewers are presently viewing the broadcast, and the broadcast time 723 may indicate how long the multimedia conference has been broadcast.

The user may interact with one or more broadcast controls 724 to control various characteristics of the broadcast, such as starting the broadcast and/or pausing the broadcast. In addition, the user may interact with one or more broadcast controls 724 to control various characteristics of the composite multimedia stream being broadcast, such as changing the volume level of an audio stream of a participant that is being broadcast, changing the quality of a video stream of a participant that is being broadcast, or generally any characteristics of the composite multimedia stream and/or the audio and/or video streams of each participant.

The user may also interact with broadcast layout controls 725 to control the layout of the composite multimedia stream being broadcast. For example, the user may use the broadcast layout controls 725 to change the arrangement of the video streams of the participants within the composite multimedia stream and/or to change the size of the video stream of each participant within the composite multimedia stream. In response to the user interacting with the broadcast controls 724 and/or the broadcast layout controls 725 to modify the composite multimedia stream, electronic device 102 may transmit information to broadcast server 116 and/or multimedia conference server 110 that indicates the modifications to the composite multimedia stream. The modifications to the composite multimedia stream may then be affected by the multimedia conference server 110 and/or the broadcast server 116.

The user may initiate a separate chat with one of the participants in the multimedia conference by interacting with the chat selector 701, may invite another user to participate in the multimedia conference by interacting with the invite selector 702, and may share their screen with one or more of the participants in the multimedia conference by interacting with the screenshare selector 703. The user may control whether their device is transmitting an audio stream, or the volume or quality of the audio stream transmitted by their device, by interacting with the audio selector 704, and may control whether their device is transmitting a video stream, and/or the quality of the video stream transmitted by their device, by interacting with the video selector 705. The user may access preferences by interacting with the preferences selector 706, may exit the multimedia conference by interacting with the exit selector 707, and may post the live composite multimedia stream and/or a recording of the composite multimedia stream, such as to a content distribution network, by interacting with the broadcast selector 708.

Figure 8:
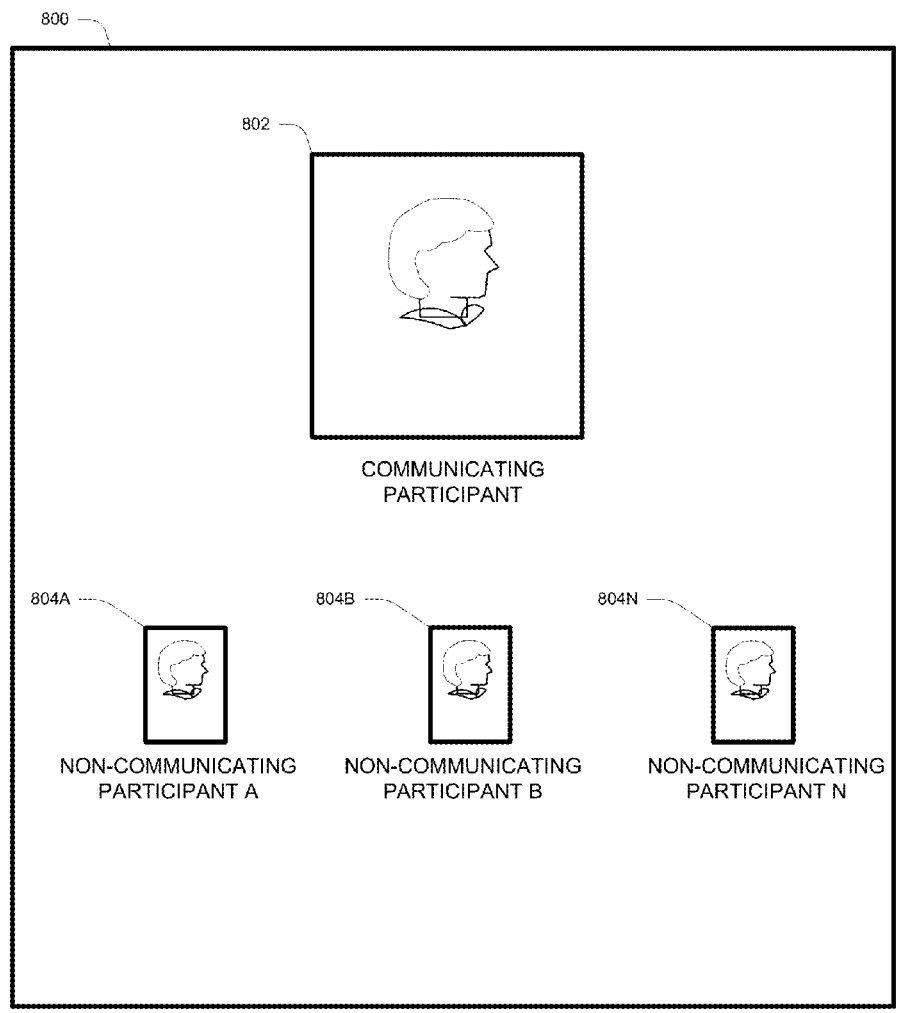
FIG. 8 illustrates an example composite multimedia stream layout for a multimedia conference broadcast system.

FIG. 8 illustrates an example composite multimedia stream layout 800 for a multimedia conference broadcast system. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The composite multimedia stream layout 800 may include a video stream 802 of a communicating participant, and video streams 804A-N of non-communicating participants. The video stream 802 of the communicating participant may have a high quality level, while the video streams 804A-N of the non-communicating participants may have a low quality level. The video stream 802 of the communicating participant may be displayed in a larger portion of the composite video broadcast 800 than the video streams 804A-N of the non-communicating participants. Alternatively, or in addition, the video streams 802 of the communicating participant may be displayed in focus, while the video streams 804A-N of the non-communicating participants may be displayed out of focus.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

V. Example Multimedia Conference Broadcast Systems

Figure 9:
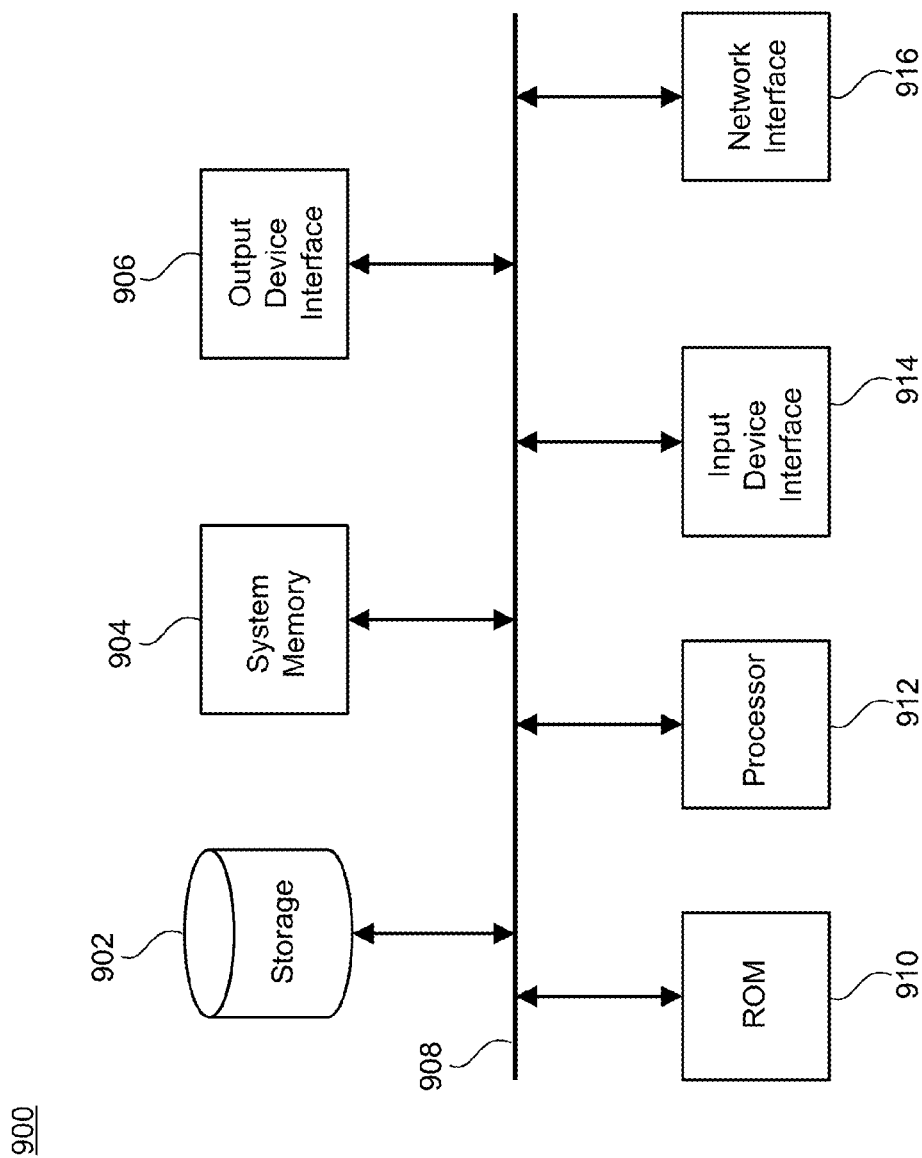
FIG. 9 conceptually illustrates an electronic system with which some implementations of the subject technology may be implemented.

FIG. 9 conceptually illustrates an electronic system with which some implementations of the subject technology are implemented. Electronic system 900 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such as random access memory. System memory 904 stores some of the instructions and data that the processor needs at runtime. In some implementations, the processes of the subject disclosure are stored in system memory 904, permanent storage device 902, and/or ROM 910. For example, the various memory units include instructions for broadcasting a multimedia conference in accordance with some implementations. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Alternatively, or in addition, some implementations may be performed using one or more graphics processing units (GPUs).

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term web site, as used herein, may include any aspect of a web site, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

In one example, a computer-implemented method for broadcasting a multiway video conference may include receiving, using one or more computing devices, a plurality of video streams from a plurality of user devices, broadcasting, using the one or more computing devices, the plurality of video streams, wherein a first video stream of the plurality of video streams is broadcast at a first quality level and the remaining video streams of the plurality of video streams are broadcast at a second quality level, the first quality level being higher than the second quality level, determining, using the one or more computing devices, that a second video stream of the plurality of video streams should be broadcast at the first quality level, and in response to the determining, and independent of control signaling transmitted to the plurality of user devices, broadcasting, using the one or more computing devices, the second video stream of the plurality of video streams at the first quality level and broadcasting the remaining video streams of the plurality of video streams at the second quality level.

Each of the plurality of video streams may include base layer data and enhancement layer data. Broadcasting the second video stream of the plurality of video streams at the first quality level may include broadcasting the second video stream using the base layer data and the enhancement layer data. Broadcasting the remaining video streams of the plurality of video streams at the second quality level may include broadcasting the remaining video stream of the plurality of video streams using the base layer data exclusive of the enhancement layer data.

The method may further include storing, using the one or more computing devices, each of the plurality of video streams, and processing, using the one or more computing devices, the stored plurality of video streams, wherein the first video stream of the stored plurality of video streams is processed using the base layer data exclusive of the enhancement layer data and the second video stream of the stored plurality of video streams is processed using the base layer data and the enhancement layer data.

The method may further include rendering a composite multimedia stream comprising each of the plurality of video streams. Broadcasting the plurality of video streams may include broadcasting the composite multimedia stream. The method may further include transmitting, using the one or more computing devices and to each of the plurality of devices, the video streams corresponding to the other of the plurality of devices, wherein the transmitting the plurality of video streams is independent of the broadcasting the plurality of video streams.

The determining that the second video stream should be broadcast at the first quality level may include determining, using the one or more computing devices, that a user associated with the second video stream is communicating. The determining that the second video stream should be broadcast at the first quality level may include receiving, using the one or more computing devices, an indication that the second video stream should be broadcast at the first quality level. The first and second quality levels may correspond to at least one of a frame rate, a resolution, an image quality, or a bit rate of the plurality of video streams.

In another example, a computer-implemented method for broadcasting a multiway video conference may include receiving, using one or more computing devices, a plurality of video streams from a plurality of user devices, wherein a first video stream of the plurality of video streams is characterized by a first quality level and the remaining video streams of the plurality of video streams are characterized by a second quality level, the first quality level being higher than the second quality level, transmitting, using the one or more computing devices and to each of the plurality of devices, the plurality of video streams corresponding to the other of the plurality of devices, determining, using the one or more computing devices, that the plurality of video streams should be broadcast, transmitting, using the one or more computing devices and to each of the plurality of user devices, an indication that each of the plurality of user devices should transmit a video stream at the first quality level, receiving, using the one or more computing devices, the plurality of video streams from the plurality of user devices, wherein each of the plurality of video streams is characterized by the first quality level, and broadcasting, using the one or more computing devices, the plurality of video streams, wherein the broadcasting the plurality of video streams is independent of the transmitting the plurality of video streams. The first quality level and the second quality level may include an indication of quality that is relative to the capabilities of each of the plurality of user devices. The first quality level may refer to a highest quality video stream that each of the plurality of user devices is capable of transmitting.

In another example, a system may include a processor and a memory including instructions that, when executed by the processor, cause the processor to facilitate the steps of: receiving a plurality of video streams from a plurality of user devices, broadcasting the plurality of video streams, wherein a first video stream of the plurality of video streams is broadcast at a first quality level and the remaining video streams of the plurality of video streams are broadcast at a second quality level, the first quality level being higher than the second quality level, determining that a second video stream of the plurality of video streams should be broadcast at the first quality level, and in response to the determining, and irrespective of control signaling transmitted to the plurality of user devices, broadcasting the second video stream of the plurality of video streams at the first quality level and broadcasting the remaining video streams of the plurality of video streams at the second quality level.

Each of the plurality of video streams may include base layer data and enhancement layer data. The broadcasting of the second video stream of the plurality of video streams at the first quality level may include broadcasting the second video stream using the base layer data and the enhancement layer data. The broadcasting of the remaining video streams of the plurality of video streams at the second quality level may include broadcasting the remaining video stream of the plurality of video streams using the base layer data exclusive of the enhancement layer data.

In another example, a non-transitory machine readable medium embodies instructions that, when executed by a machine, allow the machine to perform a method for broadcasting a multiway video conference. The method includes receiving, using one or more computing devices, a plurality of video streams from a plurality of user devices, wherein a first video stream of the plurality of video streams is characterized by a first quality level and the remaining video streams of the plurality of video streams are characterized by a second quality level, the first quality level being higher than the second quality level, transmitting, using the one or more computing devices and to each of the plurality of devices, the plurality of video streams corresponding to the other of the plurality of devices, determining, using the one or more computing devices, that the plurality of video streams should be broadcast, transmitting, using the one or more computing devices and to each of the plurality of user devices, an indication that each of the plurality of user devices should transmit a video stream at the first quality level, receiving, using the one or more computing devices, the plurality of video streams from the plurality of user devices, wherein each of the plurality of video streams is characterized by the first quality level, and broadcasting, using the one or more computing devices, the plurality of video streams, wherein the broadcasting the plurality of video streams is independent of the transmitting the plurality of video streams. The first quality level and the second quality level may include an indication of quality that is relative to the capabilities of each of the plurality of user devices.

What is claimed is:

1. A computer-implemented method, comprising:
    initiating a connection to a multimedia conference, the multimedia conference being hosted with a plurality of participant devices, the plurality of participant devices including one or more communicating participant devices and one or more non-communicating participant devices;
    receiving one or more data streams from at least one participant device of the plurality of participant devices through the initiated connection;
    integrating the received data streams into a composite stream;
    encoding the composite stream into a broadcast format based on the received data streams, the broadcast format including one or more first data streams in a first broadcast quality for the one or more communicating participant devices and one or more second data streams in a second broadcast quality different than the first broadcast quality for the one or more non-communicating participant devices; and
    providing the encoded composite stream for broadcast to a plurality of endpoint devices, the plurality of endpoint devices being non-participants of the multimedia conference, the composite stream being broadcast independent of the initiated connection to the multimedia conference.

2. The computer-implemented method of claim 1, wherein receiving the one or more data streams comprises:
    receiving one or more low quality data streams from the one or more non-communicating participant devices; and
    receiving one or more high quality data streams from the one or more communicating participant devices.

3. The computer-implemented method of claim 2, wherein the one or more first data streams comprise the one or more high quality data streams, and wherein the one or more second data streams comprise the one or more low quality data streams.

4. The computer-implemented method of claim 1, wherein encoding the composite stream comprises:
    encoding different versions of the composite stream based on bandwidth capabilities of the plurality of endpoint devices, wherein each of the different versions of the composite stream corresponds to a different broadcast quality.

5. The computer-implemented method of claim 4, wherein each of the different versions of the composite stream has a different layout based on display capabilities of the plurality of endpoint devices, wherein at least one of the different versions of the composite stream includes a first layout that includes a data stream corresponding to one of the plurality of participant devices, and wherein at least one of the different versions of the composite stream includes a second layout that includes data steams corresponding to each of the plurality of participant devices.

6. The computer-implemented method of claim 4, wherein each of the different versions of the composite stream includes a primary data stream and a secondary data stream, wherein the primary data stream corresponds to a different one of the plurality of participant devices and the secondary data stream corresponds to remaining ones of the plurality of participant devices for each of the different versions of the composite stream.

7. The computer-implemented method of claim 6, further comprising:
    providing a control user interface to the plurality of endpoint devices; and
    receiving a user selection via the control user interface from at least one of the plurality of endpoint devices, the user selection indicating which version among the different versions of the composite stream is to be provided for display at the at least one of the plurality of endpoint devices.

8. The computer-implemented method of claim 1, wherein the composite stream is formed independent of a data stream from the plurality of endpoint devices.

9. The computer-implemented method of claim 1, wherein integrating the received data streams comprises:
    decoding the received data streams into a raw format; and
    combining the decoded data streams in the raw format into the composite stream.

10. A system, comprising:
one or more processors; and
a memory including instructions that, when executed by the one or more processors, cause the one or more processors to perform operations comprising:
  initiating a connection to a multimedia conference with a plurality of first endpoint devices, the plurality of first endpoint devices including one or more communicating participant devices and one or more non-communicating participant devices;
  receiving one or more data streams from at least one endpoint device of the plurality of first endpoint devices through the initiated connection;
  generating a composite stream based on the received data streams;
  encoding the composite stream into a broadcast format based on the received data streams, the broadcast format including one ore more first data streams in a first broadcast quality for the one or more communicating participant devices and one or more second data streams in a second broadcast quality different than the first broadcast quality for the one or more non-communicating participant devices; and
  providing the encoded composite stream for broadcast to a plurality of second endpoint devices, the plurality of second endpoint devices being non-participants of the multimedia conference, the composite stream being broadcast independent of the initiated connection to the multimedia conference.

11. The system of claim 10, wherein the one or more first data streams comprise one or more high quality data streams, and wherein the one or more second data streams comprise one or more low quality data streams.

12. The system of claim 10, wherein the instructions further cause the one or more processors to:
  encode different versions of the composite stream based on bandwidth capabilities of the plurality of second endpoint devices, wherein each of the different versions of the composite stream corresponds to a different broadcast quality.

13. The system of claim 12, wherein each of the different versions of the composite stream has a different layout based on display capabilities of the plurality of second endpoint devices, wherein at least one of the different versions of the composite stream includes a first layout that includes a data stream corresponding to one of the plurality of second endpoint devices, and wherein at least one of the different versions of the composite stream includes a second layout that includes data steams corresponding to each of the plurality of second endpoint devices.

14. The system of claim 12; wherein each of the different versions of the composite stream includes a primary data stream and a secondary data stream, wherein the primary data stream corresponds to a different one of the plurality of first endpoint devices and the secondary data stream corresponds to a remaining ones of the plurality of first endpoint devices for each of the different versions of the composite stream.

15. The system of claim 14, wherein the instructions further cause the one or more processors to:
  provide a control user interface to the plurality of second endpoint devices; and
  receive a user selection via the control user interface from at least one of the plurality of second endpoint devices, the user selection indicating which version among the different versions of the composite stream is to be provided for display at the at least one of the plurality of second endpoint devices.

16. The system of claim 10, wherein the composite stream is formed independent of a data stream from the plurality of second endpoint devices.

17. A non-transitory machine-readable medium embodying instructions that, when executed by one or more processors, cause the one or more processors to perform operations comprising:
  receiving one or more data streams from at least one device of a plurality of first endpoint devices through a connection to a multimedia conference, the plurality of first endpoint devices including one or more communicating participant devices and one or more non-communicating participant devices;
  combining the received data streams into a composite stream;
  encoding the composite stream into a broadcast format based on the received data streams, the broadcast format including one or more first data streams in a first broadcast quality for the one or more communicating participant devices and one or more second data streams in a second broadcast quality different than the first broadcast quality for the one or more non-communicating participant devices; and
  providing the encoded composite stream for broadcast to a plurality of second endpoint devices, the plurality of second endpoint devices being non-participants of the multimedia conference, the encoded composite stream being broadcast independent of the connection to the multimedia conference.

\* \* \* \* \*